United States Patent
Brown et al.

(10) Patent No.: US 8,108,476 B2
(45) Date of Patent: Jan. 31, 2012

(54) HIGH PERFORMANCE ELECTRONIC MESSAGE DELIVERY ENGINE

(75) Inventors: Scott T. Brown, Superior, CO (US);
Kelly A. Wanser, Thornton, CO (US);
Victor Ganora, Jr., Louisville, CO (US)

(73) Assignee: Quest Software, Inc., Aliso Viejo, CA (US)

( * ) Notice: Subject to any disclaimer, the term of this patent is extended or adjusted under 35 U.S.C. 154(b) by 380 days.

(21) Appl. No.: 12/475,729

(22) Filed: Jun. 1, 2009

(65) Prior Publication Data
US 2009/0240780 A1 Sep. 24, 2009

Related U.S. Application Data

(62) Division of application No. 10/876,964, filed on Jun. 25, 2004, now abandoned.

(60) Provisional application No. 60/485,167, filed on Jul. 7, 2003.

(51) Int. Cl.
*G06F 15/16* (2006.01)
(52) U.S. Cl. .................................. 709/206; 709/246
(58) Field of Classification Search .................. 709/206, 709/246
See application file for complete search history.

(56) References Cited

U.S. PATENT DOCUMENTS

| | | | |
|---|---|---|---|
| 5,414,650 | A | 5/1995 | Hekhuis |
| 6,035,327 | A * | 3/2000 | Buckley et al. ............... 709/206 |
| 6,434,601 | B1 | 8/2002 | Rollins |
| 6,434,618 | B1 * | 8/2002 | Cohen et al. .................. 709/228 |
| 6,671,718 | B1 | 12/2003 | Meister et al. |
| 6,829,636 | B1 | 12/2004 | Kubik et al. |
| 6,941,348 | B2 * | 9/2005 | Petry et al. ..................... 709/206 |
| 7,020,692 | B2 | 3/2006 | Cianciarulo et al. |
| 7,058,687 | B2 * | 6/2006 | Kucherawy ................... 709/206 |
| 7,146,402 | B2 * | 12/2006 | Kucherawy ................... 709/206 |

(Continued)

FOREIGN PATENT DOCUMENTS
WO WO-02/11025 A2 2/2002

OTHER PUBLICATIONS

Stephane Lentz, Milter, http://milter.free.fr/intro/, slides1 and 2, France, Apr. 14, 2004.

(Continued)

*Primary Examiner* — Kevin Bates
(74) *Attorney, Agent, or Firm* — Knobbe Martens Olson & Bear LLP

(57) ABSTRACT

In a messaging system interfaced through the Internet, a method for processing a message from a sender and intended for delivery to at least one recipient, which sender is interfaced to the Internet through a sender server and which recipient is interfaced to the Internet through a recipient server, where the message includes at least recipient information and message body, is disclosed. The method includes testing the recipient information by establishing a temporary test connection through the Internet from the sender server to the recipient server, before relying on the recipient information for sending the message, so as to provide an indication of deliverability of the message to the recipient without using an SMTP VRFY command.

7 Claims, 26 Drawing Sheets

U.S. PATENT DOCUMENTS

| | | | |
|---|---|---|---|
| 7,219,131 B2 * | 5/2007 | Banister et al. | 709/206 |
| 7,249,175 B1 * | 7/2007 | Donaldson | 709/225 |
| 7,603,472 B2 * | 10/2009 | Petry et al. | 709/230 |
| 7,720,911 B2 * | 5/2010 | Addante et al. | 709/206 |
| 2002/0112008 A1 * | 8/2002 | Christenson et al. | 709/206 |
| 2003/0018727 A1 * | 1/2003 | Yamamoto | 709/206 |
| 2003/0200265 A1 | 10/2003 | Henry | |
| 2004/0221011 A1 * | 11/2004 | Smith et al. | 709/206 |
| 2004/0249893 A1 | 12/2004 | Leeds | |

OTHER PUBLICATIONS

Sendmail, Inc., Milter API, http://www.milter.org/milter_api/api.html, 2003.

Bill Ball et al, Red Hat Lenux 9, Sams, May 8, 2003, Chapter 19.

David Pitts et al, Red Hat Lenux 6 (Unleashed), Sams, Jul. 30, 1999, Chapter 7.

Burgess, Glen, International Search Report for PCT/US04/22729 as mailed Feb. 21, 2007 (4 pages).

* cited by examiner

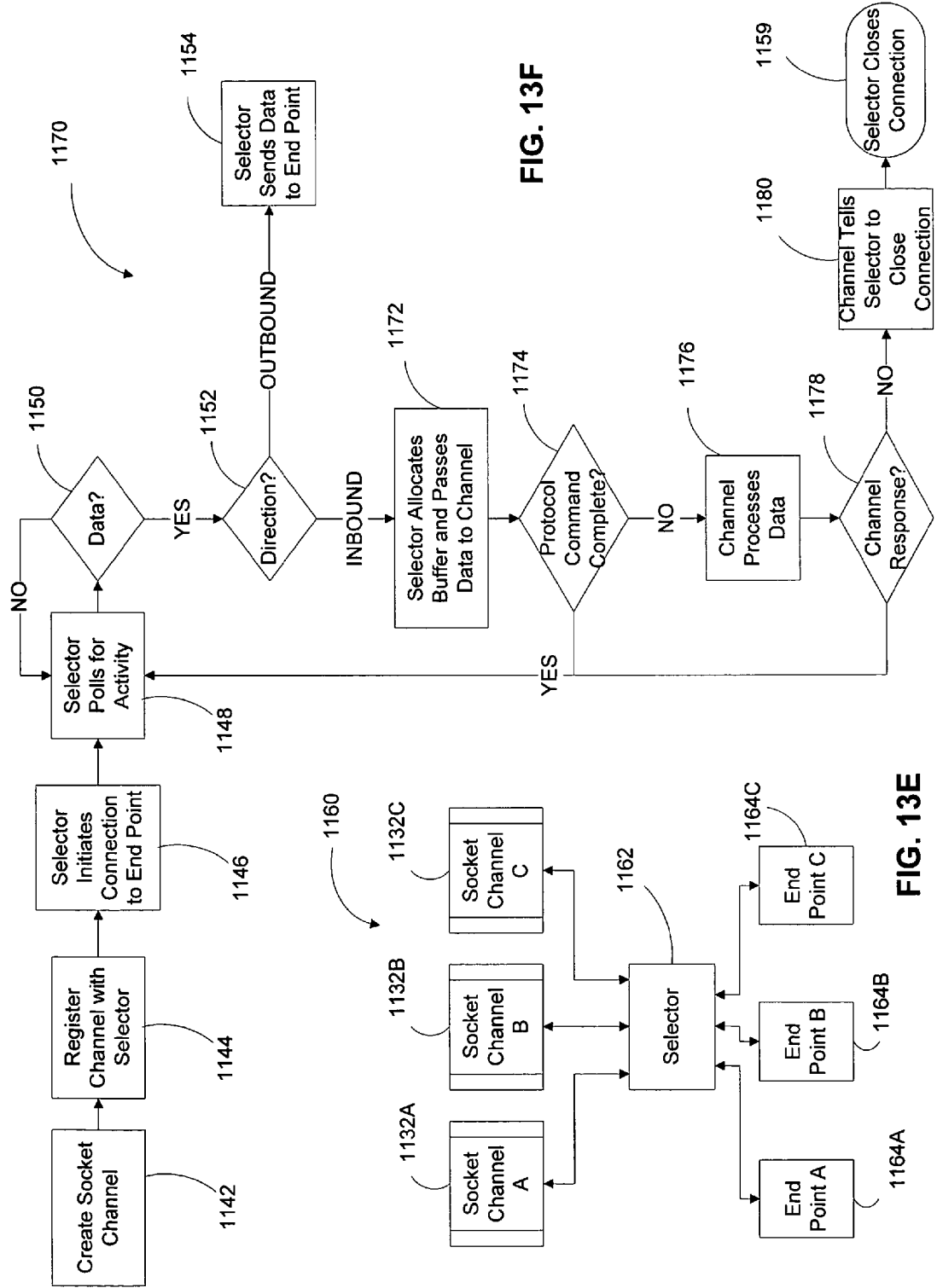

HIGH PERFORMANCE ELECTRONIC MESSAGE DELIVERY ENGINE

CROSS-REFERENCE TO RELATED APPLICATIONS

The present application is a divisional application of application Ser. No. 10/876,964, filed Jun. 25, 2004 now abandoned; which claims the benefit of U.S. Provisional Patent Application No. 60/485,167 filed Jul. 7, 2003, all of which the contents are hereby incorporated by reference.

BACKGROUND OF THE INVENTION

The present invention relates generally to electronic messaging systems and, more particularly, to an electronic message delivery system for processing electronic messages from a sender to a recipient through the Internet.

Electronic Message Delivery Challenges

Electronic messaging has quickly become an integral part of everyday life in modern society. Today, electronic mail (e-mail) is the most widely used application of the Internet and the fastest growing communication medium. In addition to the dramatic expansion of one-to-one user correspondence, many companies have come to realize that regular outbound electronic message communication, as well as automated customer care services via e-mail, can strengthen a company's relationship with its customers. However, sending and receiving high volumes of e-mail presents a number of technical challenges such as, for example: 1) management and support of ballooning infrastructures for high volume sending; 2) maintenance of security on an application that is open to the Internet; 3) the need to apply virus, content and other filters to e-mail as it enters or departs the network; 4) management and prioritization of message queues; 5) the use of native customer data to trigger, target and define messages to customers; 6) management of inbound "bounced" e-mail; 7) the ability to consistently and automatically support customer preferences; and 8) executing delivery quickly and efficiently.

Meeting these challenges for scalable electronic messaging programs has been difficult, if not impossible, using available technology and has required substantial investment in hardware and human capital. Currently, companies and organizations of all types, including e-mail specialists and service providers, continue to deploy decades-old technology for sending and routing e-mail across the Internet via Mail Transfer Agents (MTAs) that did not anticipate the explosion in traffic volumes and system complexity of today's networks.

Prior-Art MTAS and Open-Source Mail Routing Servers

E-mail was developed to deliver electronic correspondence from one user to another on a computer network, where a user is a member of an e-mail messaging system and may be a person, a machine or an application having an e-mail address within the domain of the e-mail messaging system. The primary technology for e-mail is the TCP/IP communication protocol known as Simple Mail Transfer Protocol (SMTP), which was invented in 1981 and is designed to support the routing and delivery of electronic messages from a user of one computer to a user of a receiving computer via compatible routing delivery servers across the Internet. SMTP facilitated e-mail delivery by standardizing message formats with common headers and routing information and establishing command syntax and processes for communication transactions between e-mail handling applications.

In general, e-mail applications fall into at least one of three classifications that play a specific role in the process of moving and managing e-mail messages. The first application classification is a Mail Transfer Agent (MTA), which transfers e-mail messages between hosts and networks across the Internet using SMTP. A message may travel across several MTAs on its way to its intended destination. The second application classification is a Mail Delivery Agent (MDA), which transmits outbound messages to the MTA for delivery from the local host or network, and is invoked by the MTA to file incoming e-mail in the intended recipient's mailbox. In practice, many MTAs have an MDA built in, and some MDAs include certain MTA components. The third application classification is a Mail User Agent (MUA), which is essentially an e-mail client application that, at minimum, allows a user to read and compose e-mail messages from an MDA.[1]

In the current state of the art, MTAs route e-mail messages from local hosts and networks through the gateway to the Internet to other MTA mail servers en route to recipients. MTA technology was developed by Eric Allman at UC Berkeley in the mid 1980's, and the basic architecture and components of the original MTA technology are still being used today.[2]

MTAS—Current Art

In the current state of the art, the standard process for MTA e-mail sending is as follows:

1. At the MTA, accept an incoming SMTP-formatted message from an MDA or other e-mail generating application;
2. Write the incoming message to a file on the hard drive for temporary storage;
3. Read the message's SMTP headers for destination information;
4. Find the destination's mail exchange (MX) record through a Domain Name Service (DNS) lookup;
5. Open a connection (i.e., socket) with an MTA at the destination network;
6. Through this socket, conduct an SMTP communication consisting of a series of information transmissions from the sending MTA and replies from the receiving MTA, verifying identities and validating deliverability or communicating temporary or permanent deliverability failures;
7. Transmit the message; and
8. Await any short-term reply messages from the recipient MTA containing delivery failure errors ("bounces"). In the event of a delivery failure error, resend the message. Otherwise, delete the message from the hard drive and end the process.

The sequence from connection to transmission is substantially uniform and standard in the current state of the art. The transmission of the message is the first part of a complete delivery process in which, after the message is transmitted, the MTA continues to store a copy of the message for a period in which any short-term failure messages (i.e., bounces), SMTP e-mails sent to the sending MTA from the receiving MTA communicating a delivery failure, may be received. If such bounces are received, the sending MTA uses the stored copy of the message to repeat the entire process and send the message again (i.e., retry). Typically, an MTA will retry a bounced message several times in succession before terminating the delivery process and forwarding a delivery failure message to the sender. This process may repeat while an e-mail is passed between MTAs en route from its origin to its final destination.

Turning now to the figures, in which like items are indicated using like reference numbers, attention is initially directed to FIGS. 1A and 1B, which respectively illustrate prior art configuration and SMTP process for directing e-mail messages from a sender to a recipient. FIG. 1A illustrates a prior art, multi-user e-mail messaging system, generally indicated by a reference number 10, for sending and receiving SMTP e-mail through an MTA. System 10 includes a plurality of senders (represented by boxes 12A-12F) connected with a sender MDA 14. Senders 12A-12F generate a plurality of e-mail messages 16 and direct the e-mail messages to sender MDA 14. Each one of the plurality of e-mail messages 16 generally includes a header, which contains information about the originating sender (such as sender user name and sender server domain name) and the intended recipient (such as recipient user name and recipient server domain name), and a message body, which contains, for instance, the message text. Sender MDA 14 transmits e-mail messages 16 to a sender MTA 20. It is noted that specific components of sender MDA 14 and sender MTA 20, such as processors and hard drives, are not shown in FIG. 1A for simplicity. Sender MTA 20 initiates SMTP communication through the Internet (represented by a reference item 30) with a recipient MTA 40 so as to relay e-mail messages 16 to recipient MTA 40. Recipient MTA 40 forwards e-mail messages 16 to a recipient MDA 44, which then directs the messages to the respective, intended recipients, selected from one of a plurality of recipients (represented by boxes 46A-46F). The process as shown in FIG. 1A may be reversed such that recipients 46A-46F may generate a plurality of e-mail messages that are sent through the MDAs and MTAs to senders 12A-12F.

Referring now to FIG. 1B in conjunction with FIG. 1A, an SMTP process at sender MTA 20 for sending e-mail messages is illustrated. In a process 60 as shown in FIG. 1B, sender MTA 20 first receives an electronic message (i.e., one of the plurality of e-mail messages 16) from sender MDA 14 in a step 62. MTA 20 then writes the electronic message to its hard drive in a step 64. Then, in a step 66, MTA 20 looks up the domain name of the recipient server and connects to recipient MTA 40 in a step 68. A decision 70 determines whether the connection of sender MTA 20 with recipient MTA 40 has been made and, if the result of decision 70 is YES the connection has been made, then sender MTA 20 transfers a copy of the SMTP message on its hard drive to recipient MTA 40 in a step 72. If the result of decision 70 is NO the connection has not been made, then sender MTA may schedule a retry of the delivery (i.e., loop back to step 66) at a later time in a step 74. Following step 72, a decision 76 determines whether or not the delivery of the SMTP message to recipient MTA 40 has been successful. If the result of decision 76 is YES the delivery has been successful, then the delivered SMTP message is deleted from the hard drive of sender MTA 20 in a step 78. If the result of decision 76 is NO the delivery has not been successful, then sender MTA may again schedule to resend the message at a later time by looping back to step 74.

Continuing to refer to FIGS. 1A and 1B, it is noted that sender MTA 20 and recipient MTA 40 both act essentially as blind relays in this prior art configuration of an electronic message delivery system. That is, sender MTA 20 takes in pre-formed e-mail messages 16 and directs them through the Internet regardless of considerations such as the accuracy of the recipient user name and recipient server domain name and the availability of recipient MTA 40 to accept incoming e-mail messages. As a result, system 10 inevitably generates a plurality of bounces 50 which direct resends back through sender MTA 20, sender MDA 14 and to senders 12A-12F. The processing of bounces and resends consumes the available processing capability of the sender MTA and MDA and utilizes additional communication bandwidth while transmitting and receiving multiple e-mails during the process. Applicants submit that the aforedescribed process of bounces and resends uses undesirable amounts of processing time and bandwidth in the e-mail delivery system of the prior art.

Referring now to FIG. 2 in conjunction with FIG. 1A, the standard message format of an electronic message (such as one of the plurality of e-mail messages 16 shown in FIG. 1A) is illustrated. As shown in FIG. 2, each one of the plurality of e-mail messages 16 includes a message header 90 and a message body 92. In the example shown in FIG. 2, message 90 includes such information as the date of message generation, a message ID, originating sender (i.e., "From:"), intended recipient (i.e., "To:"), and others. Message body 92 includes, for instance, the message text and associated HTML code to specify the appearance of the message. In general, since each one of the plurality of e-mail messages 16 is directed to sender MTA 20 as a single file including the message header and message body, it is not possible to perform additional processes such as, for example, adding custom content, security keys or attachments at sender MTA 20.

To summarize, the key processes in e-mail MTAs in the current state of the art are as follows:

1. SMTP feed: the exclusive receipt and processing of pre-formed SMTP messages;
2. Store-and-forward: the mechanism of writing each message to a file on the hard drive for temporary storage, forwarding the file to the receiving MTA for delivery and subsequently deleting it after the completion of the delivery process to ensure recovery, and redelivery, in the event of a system failure before the delivery process had been completed;
3. Combined validation and transmission: a fixed sequence of communication transactions within the SMTP communication with recipient MTAs that culminates in message transmission;
4. Relay: a delivery process that sends each message it receives and continues to resend those that fail; and
5. Closed architecture: an architecture that combines the aforementioned elements in an uninterruptible sequence of processes.

Recent Advances in the MTA Art

The MTA processes and characteristics described above have not changed fundamentally since the first modern MTA application, sendmail, was released in 1981. To date, advances in the art of MTA e-mail delivery have not altered any of the fundamental processes and characteristics as described above, but have, rather, worked within their constraints to optimize delivery performance by improving the speed and efficiency by which these processes are performed.

To such end, recent advances in the art have developed in conjunction with advances in the functionality of hardware operating systems that support certain of the existing key processes for MTA e-mail delivery, namely, the generation of socket connections to recipient MTAs and the storage and retrieval of message files to and from the hard drive, or file input/output (i.e., file I/O).

The generation of socket connections is the foundation of SMTP mail delivery. In the earliest embodiment of the art, sendmail, the method for establishing a socket connection to a recipient MTA relied upon the creation of a new instance of the application for each new socket (i.e., process-based socket connection). This approach is inherently processor intensive and limits delivery speed to the rate at which the application can instantiate itself on the hardware.

Thread-Based SMTP Connections

As e-mail volumes have increased, and the practice of sending messages to large lists of recipients for publishing, marketing and other purposes emerged, interest in improving the speed and processing performance of e-mail MTAs has intensified. At the same time, advances in operating systems provided the ability to support multiple concurrent chains of commands within a program (i.e., threads), enabling concurrent processes in support of multiple simultaneous data transactions with substantially lower processing overhead than required for instantiation. Thus, an e-mail MTA could generate multiple socket connections simultaneously, enabling the parallel processing of SMTP connections for much faster delivery with much lower processing overhead (i.e., thread-based socket connection).

The open-source MTA application qmail is the earliest and most widely used example of this method. Subsequent improvements in threading models for various operating systems provided more efficient memory allocation for threading that enabled dramatic increases in the number of threads that could be efficiently used for socket connections. This increase in the number of threads led to the emergence of qmail-type MTA applications optimized to run most efficiently on operating systems configured for massively multi-threaded sending of electronic messages. The most successful examples of this advance are the commercial products PowerMTA™, released in 1999, and Lyris MailEngine, released in 2001.

Asynchronous File I/O

Improvements in speed and performance arising from multi-threaded SMTP communications highlighted a new rate-limiting process in MTA e-mail delivery, the process of writing and retrieving message files to and from the hard drive, file I/O. File I/O processes are common across computer applications, and the propensity of the speed of an application, or series of processes, to slow down or bottleneck behind the sequential reading and writing of files to disk is widely known. A first significant advance in this process introduced the management of data storage across multiple drive discs in parallel (RAID), dramatically increasing speed. A second, more recent, advance in this process, released in open-source operating systems OpenBSD and Linux RedHat, enables the operating system to read and write multiple files to and from a drive simultaneously in increments, or asynchronously (i.e., asynchronous I/O). This advancement enables much more rapid reading and writing of files to disc, creating a marked improvement in efficiency for the file I/O processes in MTA applications, thereby improving processing speed and efficiency.

Thus, it became possible to optimize a qmail-based MTA application on an operating system that supports massive multi-threading and asynchronous file I/O to achieve the best performance to date from an e-mail MTA application. In fact, to ensure the optimum configuration of the operating system and tuning of the MTA application, the preferred embodiment of such an application is a pre-configured hardware appliance with RAID. Two such appliances were launched in 2001-2002: IronPort A60™ and Mirapoint Message Server. A comparison of the sustained performance of the prior art MTA applications described above, according to the published specifications, is summarized in TABLE 1.

TABLE 1

E-Mail MTA Performance

| Sustained Performance (Standard dual processor PIII or equivalent) | Sendmail | qmail | Optimized Q-mail-based MTAs | IronPort |
|---|---|---|---|---|
| E-mails (10,000 bytes)/server/hour | 10,000 | 30,000 | 200,000 | 300,000 |
| Servers required to send 4,000,000 e-mails in an 8 hour period | 50 | 17 | 3 | 2 |

The most common performance metric for MTAs is the sustained rate at which they transmit standard text messages (ranging from 5,000 to 10,000 bytes) from a standard dual Pentium 3 or Pentium 4 processor server, or an equivalent thereof. The Sendmail MTA performs the most poorly, as its speed is impaired by instantiation for socket connections and standard file I/O processing. Standard implementations of qmail perform about three times better, through the use of thread-based socket connections. Qmail-based multi-threaded MTAs offer a dramatic ten-fold improvement in performance over standard implementations of qmail while qmail-based multi-threaded MTAs that also use asynchronous I/O offer an additional 50% or more increase in performance over massively multi-threaded qmail-based MTAs without it.

Application Program Interfaces for the MTA

While sendmail and other MTAs evolved to use features and rule sets for content analysis, options available to users in performing modifications to SMTP messages and other complex processing (such as, for example, spam and attachment filtering, custom logging, disclaimer addition and virus scanning) have been limited to: 1) calls to external programs, which are generally usable only for local delivery or messages to local addresses; 2) use of the MTA in queuing mode with a program that is triggered on a regular basis; 3) use of a forwarding scheme (i.e., serial architecture with several MTA instances); or 4) altering sendmail's source code to add some extensions, thereby requiring recompilation of sendmail.[3] None of these four options are simple to use or efficient in operation. Lacking common interfaces to other application, this architecture is also referred to as a "closed architecture."

In order to facilitate the writing and integration of processing filters for e-mail, the sendmail team developed some application program interfaces (APIs) for enabling the introduction of external e-mail processing sequences at various steps in the SMTP process of the MTA.[4] These APIs were collectively called MILTER (Mail Filtering API). MILTER was first implemented in version 8.10.x of sendmail and has been officially supported in sendmail since version 8.12.x.

The MILTER API is limited in scope to post-processing, in which an API event is triggered only after each SMTP event occurs during the protocol (e.g., Connect, HELO, MAIL FROM, RCPT TO, DATA and QUIT). That is, messages may be acted upon while traveling INBOUND into a server, when a receiving server is responding to the actions of a sending server. However, there is no provision for acting upon messages before an event occurs and, consequently, there is no facility for acting upon messages traveling OUTBOUND from a server when a sending server is initiating actions.

As will be seen hereinafter, the present invention provides a remarkable improvement over the prior art as discussed above by virtue of its ability to provide increased performance while resolving the aforedescribed problems present in the current state of the art electronic message delivery systems.

References

1. Bill Ball, Hoyt Duff, Red Hat® Linux 9, Sams May 8, 2003, Chapter 11.
2. David Pitts and Bill Ball, Red Hat® Linux 6 (Unleashed), Sams Jul. 30, 1999, Chapter 7 SMTP and Protocols.
3. Stéphane Lentz, "Milter," http://milter.free.fr/intro/, slides 1 and 2, France, Apr. 14, 2004.
4. Sendmail, Inc., "Milter API," http://www.milter.org/milter api/api.html, 2003.

SUMMARY OF THE INVENTION

As will be described in more detail hereinafter, there is disclosed herein a method for use in a messaging system interfaced through the Internet. This method for processing a message from a sender and intended for delivery to at least one recipient, which sender is interfaced to the Internet through a sender server capable of communicating with a recipient server, where the message includes at least recipient information and message body, includes testing the recipient information by establishing a temporary test connection through the Internet from the sender server to the recipient server, before relying on the recipient information for sending the message, so as to provide an indication of deliverability of the message to the recipient without using an SMTP verify (VRFY) command.

In another aspect of the invention, there is disclosed a method for use in a messaging system interfaced through the Internet. This method for processing a message from a sender and intended for delivery to at least one recipient, which sender is interfaced to the Internet through a sender server capable of communicating with a recipient server, where the message includes at least recipient information and message body, includes confirming deliverability of the message to the recipient according to the recipient information. The confirming includes establishing a connection through the Internet between the sender server and the recipient server, and, from the sender server, using the connection to verify the recipient information with the recipient server so as to provide an indication, without using an SMTP VRFY command, as to whether the recipient is interfaced to the Internet through the recipient server. The indication is one of a positive confirmation that the recipient is indeed interfaced to the Internet through the recipient server and a renouncement showing that the recipient is not interfaced to the Internet through the recipient server.

In yet another aspect of the invention, there is disclosed a method for use in a messaging system interfaced through the Internet. This method for processing a message from a sender and intended for delivery to at least one recipient, which sender is interfaced to the Internet through a sender server capable of communicating with a recipient server, includes, at the sender server, receiving from the sender a plurality of discrete data packets for use in defining the message. At least one of the plurality of discrete data packets includes recipient information and at least another one of the plurality of discrete data packets includes message body. The method further includes testing the recipient information by establishing a temporary test connection through the Internet from the sender server to the recipient server, before relying on the recipient information for sending the message, so as to provide an indication of deliverability to the recipient without using an SMTP VRFY command. The method also includes, based on the indication, performing one of (i) generating the message by combining at least the recipient information and message body then establishing a delivery connection through the Internet from the sender server to the recipient server followed by directing the message through the delivery connection to the recipient server for delivery to the recipient, and (ii) aborting the delivery of the message.

In a further aspect of the invention, a method for processing a message from a sender and intended for delivery to at least one recipient in a messaging system interfaced through the Internet is disclosed. The sender is interfaced to the Internet through a sender server capable of communicating with a recipient server. The method includes, at the sender server, receiving from the sender a plurality of discrete data packets for use in defining the message. At least one of the plurality of discrete data packets includes recipient information and at least another one of the plurality of discrete data packets includes message body. The method also includes confirming deliverability of the message to the recipient according to the recipient information by establishing a connection through the Internet between the sender server and the recipient server, and, from the sender server, verifying the recipient information with the recipient server through the connection so as to provide an indication, without using an SMTP VRFY command, as to whether the recipient is interfaced to the Internet through the recipient server. The indication is one of a positive confirmation that the recipient is indeed interfaced to the Internet through the recipient server and a renouncement showing that the recipient is not interfaced to the Internet through the recipient server. The method further includes, based on the indication, performing one of (i) generating the message by combining at least the recipient information and message body, responsive to the positive confirmation, then directing the message so generated to the recipient server through the connection for delivery to the recipient, and (ii) aborting the delivery of the message, responsive to the renouncement.

In a still further aspect of the invention, a modified message server configured to replace an unmodified message server interfaced to the Internet for processing a message from a sender and intended for delivery to at least one recipient is disclosed. The sender is interfaced to the Internet through the unmodified message server capable of communicating with a recipient server. The unmodified message server includes a hard drive configured for saving the message as a message file thereon, and the unmodified message server is configured to forward the message file to the recipient server. The modified message server includes an arrangement for receiving from the sender as a plurality discrete data packets for use in defining the message. At least one of the plurality of discrete data packets includes recipient information and at least another one of the plurality of discrete data packets includes message body. The modified receiving arrangement includes electronic memory for saving the plurality of discrete data packets therein. The modified message server further includes an arrangement for processing the plurality of discrete data packets and generating the message by combining at least the recipient information and message body.

In a yet further aspect of the invention, a method for processing a group of messages from a sender in a messaging system interfaced through the Internet is disclosed. The sender is interfaced to the Internet through a sender server capable of communicating with a plurality of recipient servers, each one of the group of messages being intended for delivery to a recipient. The method includes, at the sender server, receiving from the sender a plurality of discrete data packets for use in defining the group of messages, at least one of the plurality of discrete data packets including recipient information and at least another one of the plurality of discrete data packets including message body for a corresponding one of the group of messages. The method further includes generating the group of messages by combining at least the recipient information and message body for each one of the group of messages. The method also includes arranging the group of messages in an order in accordance with a predetermined set of rules based on at least one of the recipient information and the message body of each one of the group of messages.

In another aspect of the invention, a method for processing a message from a sender and intended for delivery to at least one recipient in a messaging system interfaced through the Internet is disclosed. The sender is interfaced to the Internet through a sender server capable of communicating with a recipient server. The method includes, at the sender server, receiving from the sender a plurality of discrete data packets for use in defining the message. At least one of the plurality of discrete data packets includes recipient information and at least another one of the plurality of discrete data packets includes message body. The method also includes directing the plurality of discrete data packets through an application program interface to one of a plurality of external applications for performing at least one of (i) modifying the plurality of discrete data packets according to a first predetermined set of rules, (ii) adding additional data packets to the plurality of discrete data packets according to a second predetermined set of rules, and (iii) ordering the plurality of discrete data packets according to a third predetermined set of rules, and, consequently, for providing a plurality of resultant data packets. The method further includes receiving the plurality of resultant data packets from the one of a plurality of external applications through the application program interface, and generating the message by combining at least a portion of the plurality of resultant data packets. The method additionally includes establishing a connection through the Internet from the sender server to the recipient server, and directing the message through the connection to the recipient server for delivery to the recipient.

In a further aspect of the invention, a messaging system, interfaced through the Internet, for processing a message from a sender and intended for delivery to at least one recipient is disclosed. The sender is interfaced to the Internet through a sender server capable of communicating with a recipient server, and the message includes at least recipient information and message body. The messaging system includes a testing arrangement for testing the recipient information by establishing a temporary test connection through the Internet from the sender server to the recipient server, before relying on the recipient information for sending the message, so as to provide an indication of deliverability of the message to the recipient without using an SMTP VRFY command.

In still another aspect of the invention, a messaging system, interfaced through the Internet, for processing a message from a sender and intended for delivery to at least one recipient is disclosed. The sender is interfaced to the Internet through a sender server capable of communicating with a recipient server, and the message includes at least recipient information and message body. The messaging system includes a testing arrangement for testing the recipient information by establishing a connection through the Internet from the sender server to the recipient server, before relying on the recipient information for sending the message, in a way which provides an indication of deliverability to the recipient without using an SMTP VRFY command. The messaging system also includes a selective delivery arrangement for performing, based on the indication, one of (i) directing the message to the recipient server through the connection for to the recipient, and (ii) aborting the delivery of the message.

In a further aspect of the invention, a method for processing a message from a sender and intended for delivery to at least one recipient in a messaging system interfaced through the Internet is disclosed. The sender is interfaced to the Internet through a sender server capable of communicating with a recipient server. The messaging system includes an electronic memory for processing data. The method includes handling the message as data in the electronic memory. As an additional aspect, the messaging system further includes a hard drive for storing files, and the message is handled in the messaging system without storing the message as one of the files in the hard drive.

In a still further aspect of the invention, a method for processing a message from a sender in a messaging system interfaced through the Internet is disclosed. The sender is interfaced to the Internet through a sender server capable of communicating with a plurality of recipient servers. The message is intended for delivery to a recipient. The method includes, at least the sender server, separating the message into a plurality of discrete data packets, where at least one of the plurality of discrete data packets includes recipient information and at least another one of the plurality of discrete data packets includes message body. The method also includes testing the recipient information by establishing a connection through the Internet from the sender server to a recipient server, before relying on the recipient information for sending the message, in a way which provides an indication of deliverability to the recipient without using an SMTP VRFY command. The method further includes, based on the indication, performing one of (i) directing the message through the connection for delivery through the recipient server to the recipient, and (ii) aborting the delivery of the message. Alternatively, the testing is performed through a temporary test connection, while the message is directed through a delivery connection.

In a yet further aspect of the invention, a method for processing a group of messages from a sender in a messaging system interfaced through the Internet is disclosed. The sender is interfaced to the Internet through a sender server capable of communicating with a plurality of recipient servers. Each message in the group of messages is intended for delivery to a recipient. The method includes, at the sender server, separating each message in the group of messages into a plurality of discrete data packets, where at least one of the plurality of discrete data packets includes recipient information and at least another one of the plurality of discrete data packets includes message body for the corresponding message out of the group of messages. The method also includes arranging the group of messages in an order in accordance with a predetermined set of rules based on at least one of the recipient information and the message body for each message out of the group of messages.

In another aspect of the invention, a method for processing a message from a sender and intended for delivery to at least one recipient in a messaging system interfaced through the Internet is disclosed. The sender is interfaced to the Internet through a sender server capable of communicating with a recipient server. The messaging system includes an electronic memory for processing data and a hard drive for storing files. The method includes selecting at least one of (i) handling the message as data in the electronic memory without storing the message as one of the files in the hard drive, and (ii) storing the message as one of the files in the hard drive.

BRIEF DESCRIPTION OF THE SEVERAL VIEWS OF THE DRAWING

The present invention may be understood by reference to the following detailed description taken in conjunction with the drawings briefly described below. It is noted that, for purposes of illustrative clarity, certain elements in the drawings may not be drawn to scale.

FIG. 13E is a diagrammatic illustration of a multiple thread model, socket channel and selector communication model in accordance with the present invention.

FIG. 13F is a flow chart diagram illustrating the socket channel and selector process using TCP in accordance with the present invention.

DETAILED DESCRIPTION OF THE INVENTION

Figure 1A:
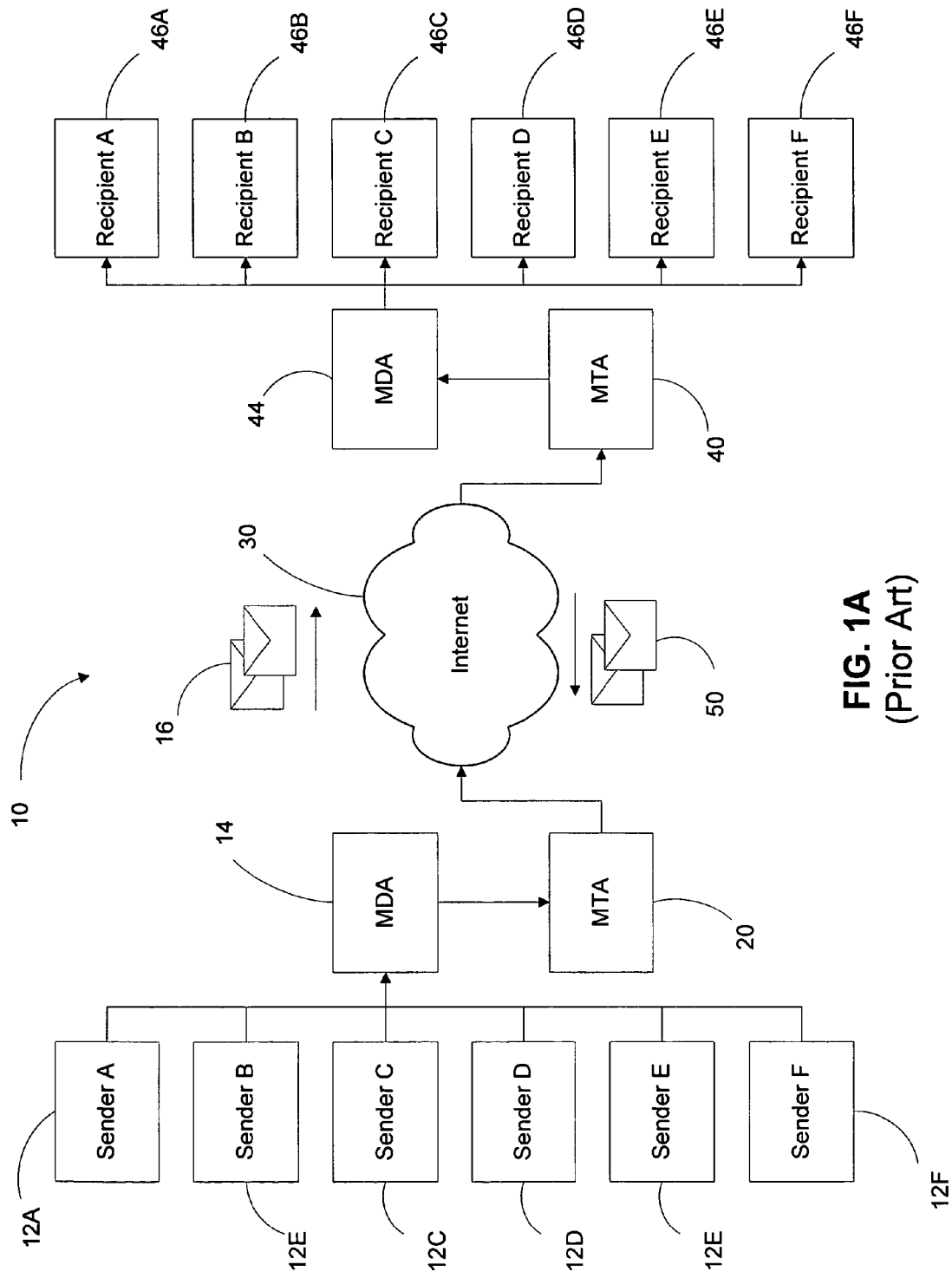
FIG. 1A is a diagrammatic illustration showing the major components of an e-mail messaging system for sending an electronic message through the Internet in accordance with the currently available prior art.
Figure 1B:
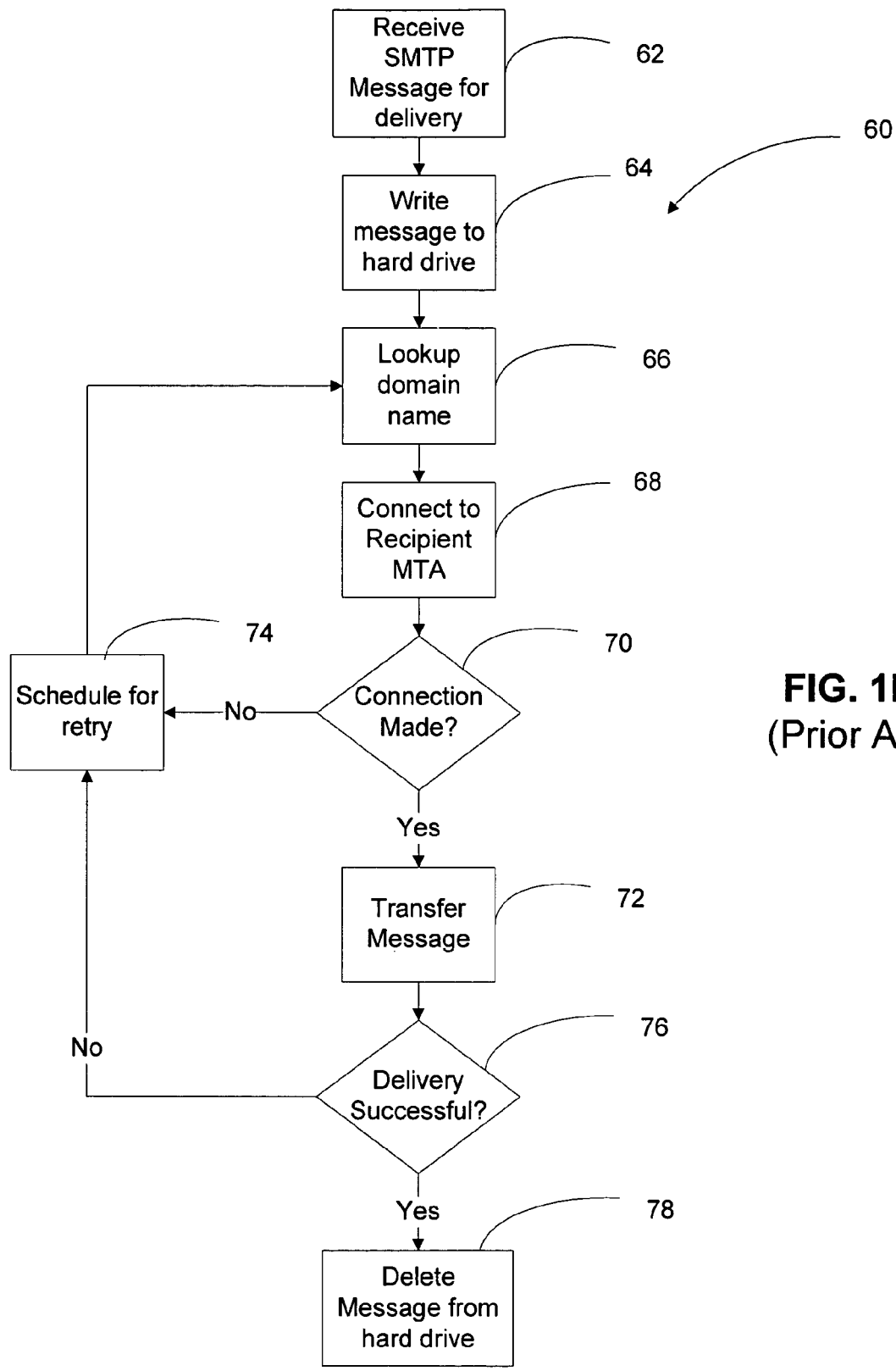
FIG. 1B is a flow chart diagram illustrating the process of sending an electronic message through the Internet using the system shown in FIG. 1A.

The following description is presented to enable one of ordinary skill in the art to make and use the invention and is provided in the context of a patent application and its requirements. Various modifications to the described embodiments will be readily apparent to those skilled in the art and the generic principles herein may be applied to other embodiments. Thus, the present invention is not intended to be limited to the embodiment shown but is to be accorded the widest scope consistent with the principles and features described herein.

Problems in the Current State of the Art

Advances in the art have yielded improvements in delivery speed and hardware efficiency in conjunction with advances in operating systems. There are, however, problems in a number of the key characteristics of e-mail MTAs that limit advances in performance, flexibility, security and feature enhancements.

Problems with the SMTP Feed

E-mail was initially created to transmit electronic messages from one (usually human) sender on a computer network to another. E-mail MTAs were created to receive and deliver e-mail messages to and from a local mail delivery agent hosting sender accounts to other MTAs outside the host or network. As the use of e-mail and the Internet have grown, users and organizations began to identify applications for e-mail outside of human-sender-generated correspondence, beginning with the use of e-mail for mass publishing and evolving into applications for direct marketing, automated transactions, support and customer care. These new applications offered tremendous potential for dramatically reducing the costs and improving the efficiency of mass-communication activities, and, thus accelerated interest in corresponding technology solutions.

The most promising applications for e-mail revolved around the ability to use databases of information on customers, members or subscribers to identify recipients, populate message content and trigger e-mail delivery. More fundamentally, an increase in the prevalence of interactions and transactions on web pages drove demand for e-mail receipts and other confirmations of online interactions.

Thus, it became important to enable databases and local web applications to send e-mail, but, since messages in this case would be created by system commands and not composed by individual users, standard MDAs would not support the required process, and e-mails would have to be sent from these systems to MTAs directly. MTAs, however, only accept pre-formed SMTP messages, while web and database applications generate data outputs. Consequently, system developers created SMTP "feeders" (e.g. Javamail) for local systems and purpose-built e-mail marketing and publishing systems that would convert data packets into electronic messages for transmission to local MTAs. Yet the SMTP feeder inherently limits the delivery speed of any MTA to the rate at which it can be fed by a feeder (in current art, about 200,000 e-mails per hour on a sustained basis).

Furthermore, as the uses of e-mail become more sophisticated, it is increasingly desirable to use information from two or more source systems to generate a message. For example, an e-commerce application may generate data for a text message containing specific information on a recently completed transaction. It may be desirable to draw targeted advertising or service content, based on information contained in the message, from a separate system. In the current state of the art, such combination of information from multiple source systems would require processing a transaction between the first system and the second system in advance of submitting a full set of content data to the SMTP feeder for generating the SMTP e-mail message. This processing between the first and second system implies significant integration between these systems, as has only been performed for large-scale e-mail operations, to the best knowledge of Applicants, by one company, Amazon.com.

Additionally, it may be desirable for an e-mail MTA to support other electronic message protocol formats in order to accept messages in other protocols for conversion to SMTP e-mail or to accept SMTP e-mail messages for conversion to other protocols, based on specifications within each message, centralized business logic or other mechanisms.

Problems with Store-and-Forward Processing

Related to the practice of SMTP feed, is the current practice of store-and-forward processing in which the MTA accepts SMTP e-mail messages into the application, writes each one to a file on the hard drive, sends it on through the delivery process and then deletes the stored message from the hard drive. This practice creates a number of problems for e-mail delivery.

As discussed previously, writing files to the hard drive, file I/O, is long-standing problem in MTA performance. While recent innovations in asynchronous file I/O have improved performance, the activity of mechanically reading and writing files to and from the hard drive is inherently processing intensive and prone to bottlenecks.

An additional problem to store-and-forward processing is the sequential, first-in-first-out (FIFO) nature of message processing in the system, arising from the fact that each e-mail is processed in isolation of any others sent in conjunction with, or in proximity to, the one being processed. This leads to one of the most significant problems in high-volume MTA e-mail delivery performance. E-mails are queued in sequence, one behind the other, for transmission through active connections. In high-volume applications, messages are further grouped by domain. This presents the unfavorable circumstance in which SMTP communications are directed at the same domain simultaneously, increasing the likelihood of slowdowns or connection failures at recipient domain MTAs. When such connections are attempted and slow or fail, they become inactive. Multiple attempted connections to the same domain, created as individual messages to the same domain, travel through the application in sequence, inactivating additional connections and slowing or halting delivery across the application, despite the initial availability of very large numbers of threads.

FIFO processing associated with store-and-forward processing creates an additional limitation to e-mail sending. In the same manner as the system is unable to review multiple recipient addresses to manage delivery attempts as connections become inactive, it is also unable to review messages and groups of messages to prioritize traffic across a queue or set of queues, where it might be desirable to assign priorities to e-mail traffic through an MTA.

A final problem to store-and-forward processing is the lack of any mechanism for introducing any additions to, or modifications of, messages. Closely related to the problem of SMTP feed, the fact that a fixed message is input into the MTA and undergoes a rigidly defined set of processes for delivery to an end recipient, strictly limits the functionality of the MTA to relaying messages. With advances in e-mail processes such as secure certificates, customized content and the like, there are now many applications that make it highly desirable to modify messages in transit from the sender application (MDA or other system) to the Internet. Similar to the problem of using two or more systems to generate a message with reference to the SMTP feed, the inability to modify the content of messages traveling through an MTA leads to the current art in which applications that generate content modifications for e-mails must be integrated into the sending application for processing prior to sending.

Problems with Combined Validation and Transmission and Relay.

It is commonly known that, in the current state of the art of MTA e-mail sending, once the MTA identifies the recipient server and opens a connection, a series of information transactions occurs in which the sending MTA validates the availability of the recipient server and the recipient server validates the deliverability of the message. In the current art, the MTA, irrespective of the results of validation, sends the message on to the recipient MTA. If the message ultimately proves to be undeliverable, the recipient server will send an SMTP error message back to the sending MTA, which will then resend the message. This process generally continues through several tries at which point the sending MTA will report a failure back to the originating sender or system, utilizing significant processing overhead, and bandwidth, for both original undeliverable e-mails and for the bounces and subsequent resends pursuant to them.

It is a longstanding problem in e-mail delivery to improve this process by validating the deliverability of a recipient e-mail address prior to sending a message and, in the event that it is not deliverable, not to send it. This problem has also been pursued for the purpose of validating deliverability for e-mail addresses in a large list to eliminate those that are permanently undeliverable from any future attempts to send e-mail. To date, attempts have focused on the use of a verification process built into sendmail for this purpose, the VRFY command, which was designed to operate independently of the standard SMTP communication process for sending e-mail. This standalone validation process could, however, also be used by operators external to a network to identify, via automated trial end error, valid e-mail addresses within the network, thereby posing a significant security hazard.

Figure 3:
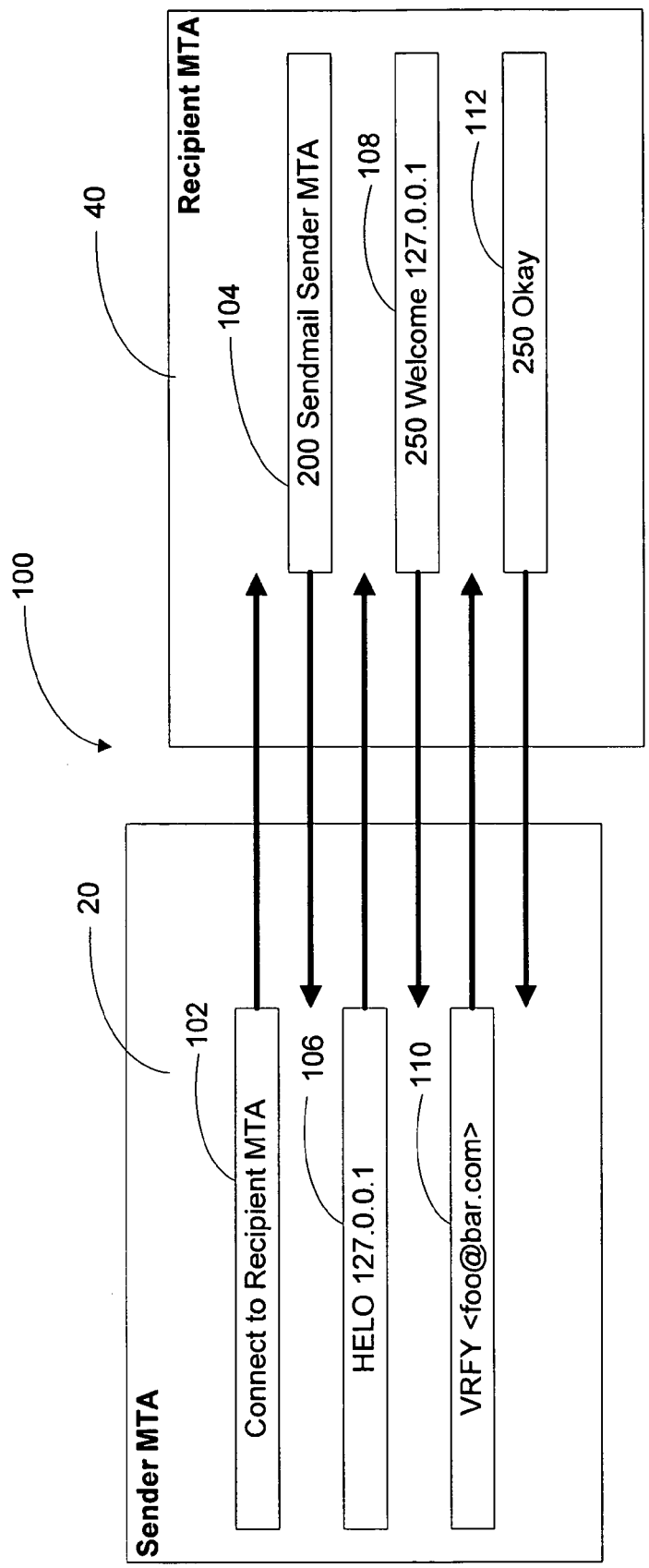
FIG. 3 is a diagrammatic illustration of a VRFY process as practiced in the prior art.

Referring now FIG. 3 in conjunction with FIG. 1A, the process of successful use of the VRFY command in a prior art messaging system of FIG. 1A is described. A VRFY process 100 is initiated by sender MTA 20 by connecting to recipient MTA 40 in a step 102. Recipient MTA 40 notes the connection in a step 104. Sender MTA 20 then sends a "HELO" to recipient MTA 40 in a step 106. In a step 108, recipient MTA 40 acknowledges the greeting by responding with a "Welcome" in a step 108. Sender MTA 20 follows up with a VRFY command to verify the validity of the e-mail address of the intended recipient. If the e-mail address of the intended recipient as sent in the VRFY command is correct at recipient MTA 40, the recipient MTA responds with an "Okay" in a step 112. Otherwise, recipient MTA 40 informs sender MTA 40 that a user by the e-mail address as sent in the VRFY command is not interfaced with the Internet through sender MTA 40.

The VRFY command is convenient since this feature is built into the commonly used application sendmail. However, since support of the VRFY process is an optional setting on recipient sendmail MTAs and is not critical to standard e-mail delivery operations, this feature is widely disabled as a security precaution. That is, rather than responding with an "Okay" as in step 112 or with a negative result, recipient MTA 40 responds to the VRFY command from the sender MTA with a notification that the VRFY feature has been disabled—thereby failing to confirm or deny the accuracy of the e-mail address of the intended recipient. Therefore, Applicants submit that the VRFY command on its own is not a solution to the problem of e-mail validation.

Problems with Application Program Interfaces for the MTA

As mentioned previously, growth in the use and applications of e-mail has led to the need and desire for processes that act on, modify, examine and otherwise interact with e-mail messages. Today, such processes include virus protection applications, SPAM filters, content filters, encryption, network signatures, policy filters, HTML template application and more. Moreover, while content-modifying applications can be applied through integration with initiating sender systems (albeit with difficulty) as mentioned previously, scanning processes are, by definition, applied to electronic messages as they travel into or across a network. An existing problem in the prior art electronic message delivery processes is the prevalence of an MTA architecture that combines current MTA processes with, at most, a single external process in one sequence. Furthermore, in cases where multiple external processes must be conducted on messages in a system or network, such external processes must be applied serially through a sequence of separate MTAs.

In the current state of the art such processes are applied serially, by sending each message through a separate application supported by a receiving MTA to accept messages and a separate, sending MTA to forward them on to the next processing application or the primary MTA for delivery through the Internet. As a consequence, the delivery efficiency of the entire system is limited by the delivery efficiency of the layers of serial processing through multiple MTAs and processing applications. The architecture is also hardware and support intensive.

Suggested Solutions

As described above, inherent limitations in the SMTP feed of currently available MTAs prohibit or limit the ability of the prior art MTAs to provide features such as, for example, increased delivery speed and combination of database information from multiple source systems. As a solution to these problems, Applicants submit an MTA that can accept data elements, raw data files or other electronic message formats though an application program interface (API), and use relevant data items to build SMTP e-mails within the MTA application. The electronic message may be, for example, an SMTP message or e-mail, or other formats of a package of electronic data intended for delivery from a sender to an intended recipient.

Additional problems exist in prior art MTAs due to the use of the store-and-forward mode of communication. Applicants submit that one solution to this problem is to store messages in Random Access Memory (RAM—i.e., electronic memory) that is accessible directly by the processor chip, thus eliminating the mechanical action associated with file I/O to realize a dramatic increase in efficiency. Early in the development of e-mail, the file I/O method was designed to ensure the recoverability of messages stored in process in the event of a system failure, and incorporated in the basic architecture of the modern MTA. Today, the risks of losing messages in process are drastically reduced by advances that have increased delivery-processing speeds such that storage time is reduced to nearly nil, and by the potential ease with which mechanisms can be designed that write files to the hard drive when the system fails.

Another problem arising from the store-and-forward processing of the prior art MTAs is the sequential, first-in-first-out (FIFO) nature of message processing, which often leads to processing bottlenecks and precludes any form of traffic prioritization or queue management. As a solution to this problem, Applicants submit the enabling of the MTA to review the domain composition across a group of messages or a recipient list and to order the processing of messages for delivery to distribute connection attempts to individual domains across the list. In this way, the likelihood of slowdowns and failures by recipient MTAs and potential bottlenecks created by exhausting thread connections with attempts to deliver to the same problematic domain are minimized. Furthermore, the present invention provides a flexible, customizable process to prioritize and manage message traffic.

The present invention also provides a solution to the deliverability validation problem by reengineering the standard SMTP communication process to enable an alternate process for messages that receive deliverability failure responses during the standard SMTP conversation. In this process, these messages are not sent on to the recipient MTA but are instead retried via additional SMTP delivery communication attempts until they are validated as deliverable and then sent, or reported as delivery failures to the originating sender or system and terminated.

The closed architecture problem is also mitigated by the present invention. The present invention provides an MTA application that enables the tight integration of corollary e-mail processes such as scanning and modification with the MTA application itself through the availability of open interfaces, at any of a number of stages in the standard SMTP process, to compatible applications designed for such processes. Such an MTA application may accept e-mails, or e-mail equivalent data files, for delivery and direct them, through a direct data interface, through these added processes prior to delivering them on to a recipient MTA. These and other features of the present invention are described in further detail immediately hereinafter.

Figure 4A:
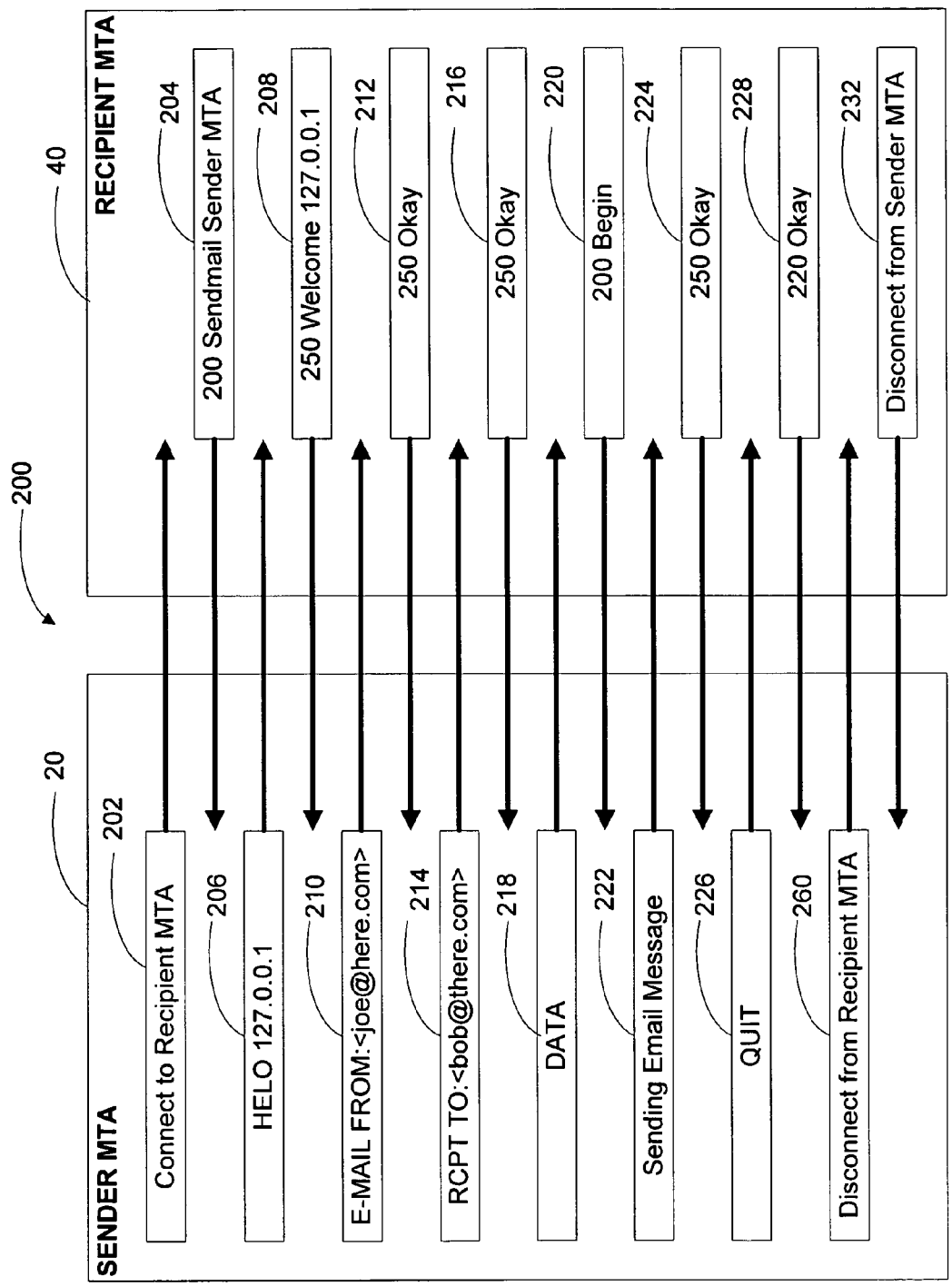
FIG. 4A is a diagrammatic illustration of an SMTP communication process in accordance with the present invention.
Figure 4B:
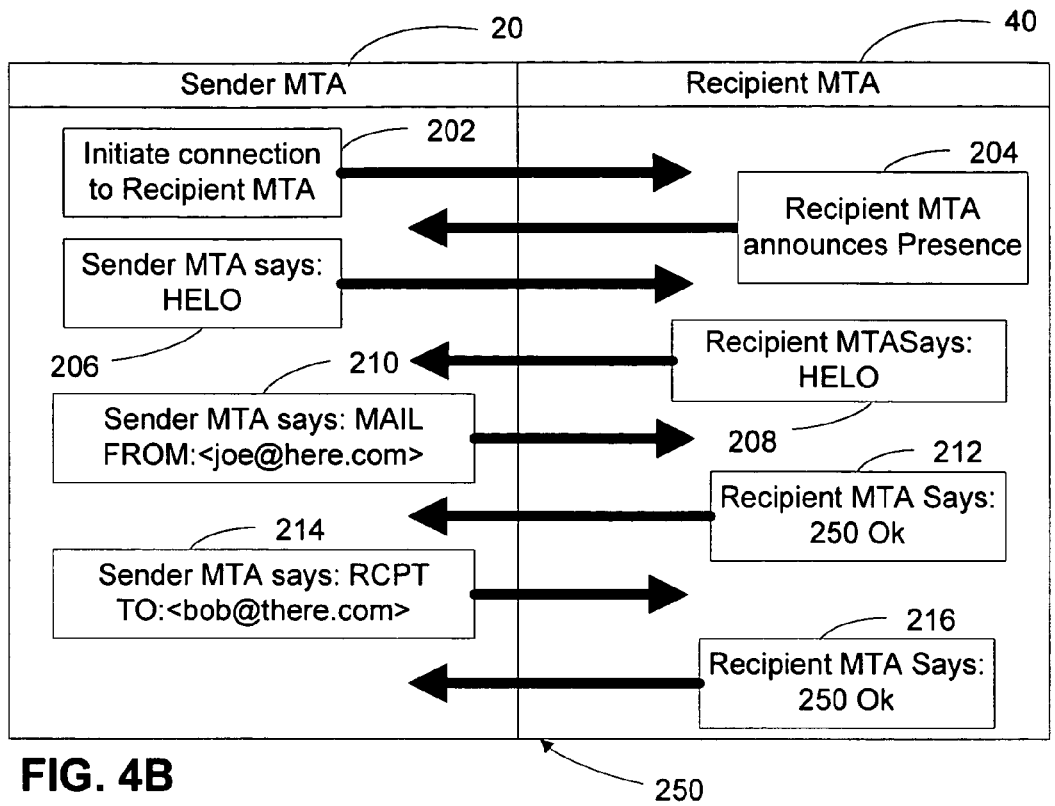
FIGS. 4B and 4C are diagrammatic illustrations of the showing further details of SMTP-based, recipient information confirmation process with positive and negative outcomes, respectively, in accordance with the present invention.
Figure 4C:
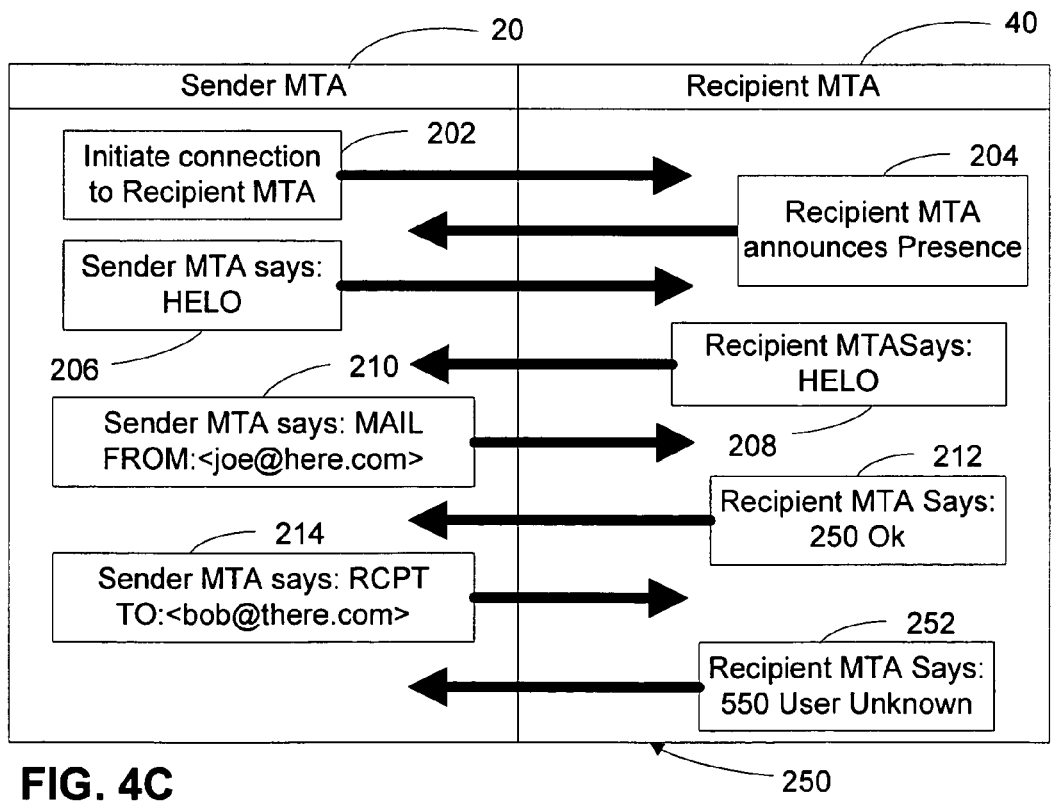

Turning now to FIGS. 4A-4C in conjunction with FIG. 1A, further details of a successful SMTP send process 200 in the prior art messaging system of FIG. 1A are shown. FIG. 4A illustrates the communication process between sender MTA 20 and recipient MTA 40 of FIG. 1A. Sender MTA 20 initiates process 200 by connecting to recipient MTA 40 in step 202. Recipient MTA 40 responds in a step 204 by noting the sender MTA. Sender MTA 20 then sends a "HELO" to recipient MTA 40 in a step 206. Recipient MTA 40 responds by sending a "Welcome" to sender MTA 20 in a step 208. In a step 210, sender MTA 20 informs recipient MTA 40 of a pending e-mail message. If recipient MTA 40 is accepting incoming messages, recipient MTA 40 responds in a step 212 with an "Okay", thereby confirming the availability of recipient MTA. Sender MTA 20 then indicates to recipient MTA 40 the e-mail address of the intended recipient in a step 214. If the e-mail address so indicated is a valid e-mail address at the recipient MTA, recipient MTA 40 then responds in a step 216 with an "Okay", thus confirming the validity of the e-mail address of the intended recipient. In a step 218, sender MTA 20 then indicates to recipient MTA 40 that it is about to send data thereto. In this successful SMTP send process 200, recipient MTA 40 responds in a step 220 with a "Begin", at which point sender MTA 20 begins to send the e-mail message in a step 222. Upon receipt of the e-mail message, recipient MTA 40 responds in a step 224 with another "Okay". Sender MTA 20 then indicates that the e-mail sending process is complete with a "Quit" in a step 226, to which recipient MTA 40 responds with an "Okay" in a step 228. Finally, sender MTA 20 disconnects from recipient MTA 40 in a step 230, and, likewise, recipient MTA 40 disconnects from sender MTA 20 in a step 232, thus completing the successful SMTP send process.

Continuing to refer to FIG. 4A, it is emphasized that confirmation of the deliverability of the e-mail message (namely, recipient MTA availability as well as validity of intended recipient information) is accomplished in the process of the present invention during the course of normal SMTP communication without resorting to, for example, the VRFY command as in the prior art. In this way, the present invention circumvents the problems of the prior art while providing much higher performance with significantly fewer bounces than was possible using prior art MTAs.

FIGS. 4B and 4C illustrate two possible outcomes of the confirmation processes as shown in FIG. 4A. FIG. 4B, showing a successful confirmation process 250, is essentially identical to the first several steps of successful SMTP send process 200 of FIG. 4A. Basically, during the course of normal SMTP communication between sender MTA 20 and recipient MTA 40, the availability of recipient MTA to accept incoming messages is confirmed in steps 210 and 212, and the validity of the e-mail address of the intended recipient is confirmed in steps 213 and 216. FIG. 4C, in contrast, illustrates an unsuccessful confirmation process 250', in which the recipient MTA, in response to the intended recipient information query in step 214, sends with a "User Unknown" message to the sender MTA in a step 252. That is, the validity of the e-mail address of the intended recipient has been renounced. In response to the renouncement, the sender MTA may, for instance, abandon the message delivery process and proceed to processing the next electronic message waiting in queue.

Figure 2:
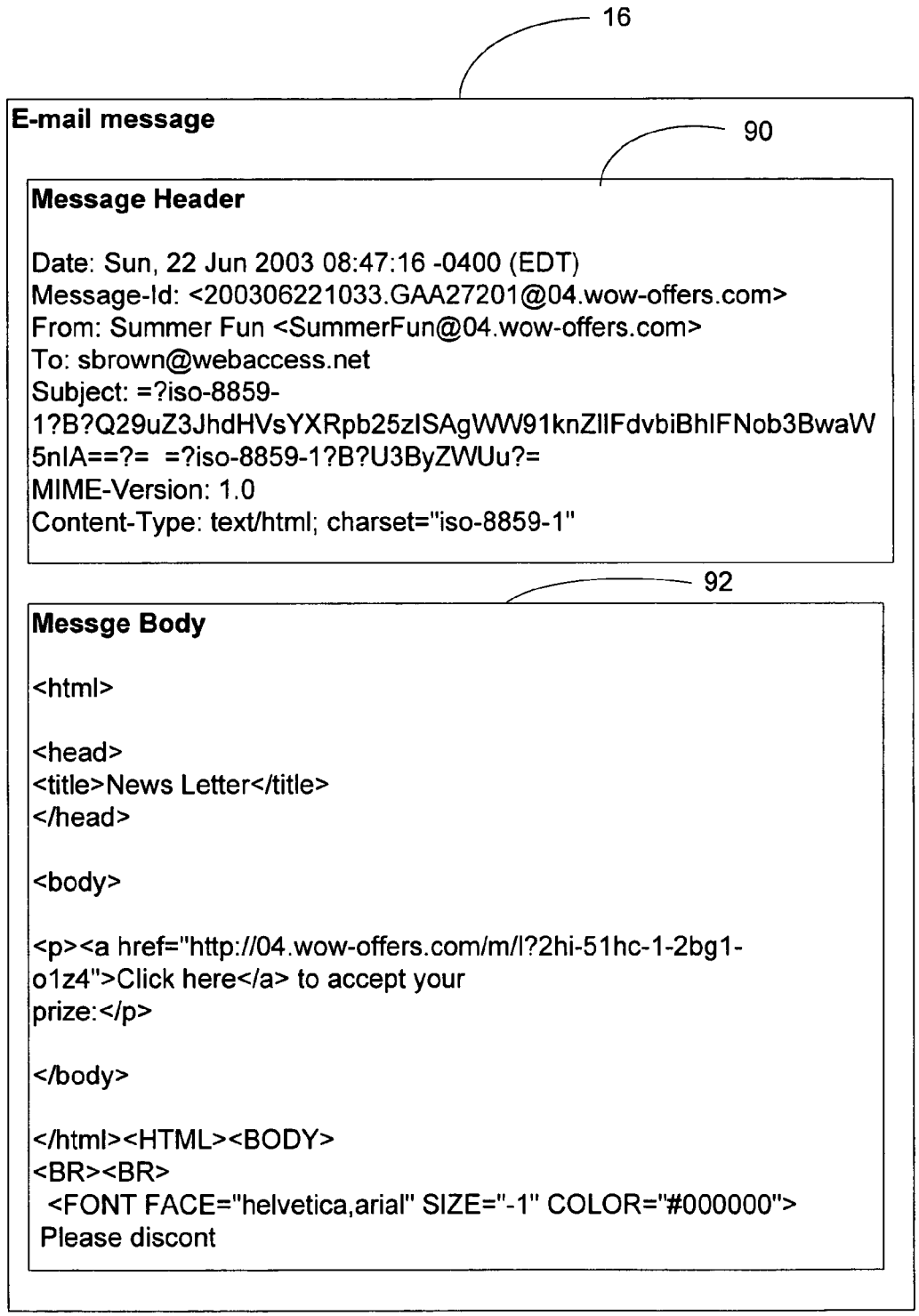
FIG. 2 is a diagrammatic illustration of an e-mail message, shown here to illustrate the main components of the e-mail message.

Attention is now directed to FIGS. 5A-5D, which illustrate further enhancements electronic message delivery system of the present invention. First referring to FIG. 5A, an electronic message delivery system 300 includes a sender MTA 320. Sender MTA 320 is configured to accept a plurality of data packets 322A (enclosed in a dashed box 324A) originated by a plurality of senders 326. Plurality of data packets 322A may include, for example, the various components composing an e-mail message, such as shown in FIG. 2. Senders 326 may be, for example, human users interfaced to the Internet through sender MTA 320. Sender MTA 320 may be additionally configured to accept a plurality of complete, electronic messages 328 from senders 326, much like prior art sender MTAs. Sender MTA 320 is also configured to accept a plurality of data packets 322B (enclosed in a dashed box 324B) generated by a computer system 330 interfaced with a database 332. For instance, computer system 330 may convert elements, contained in database 332, into the various components of an e-mail message as illustrated in FIG. 2.

Figure 5A:
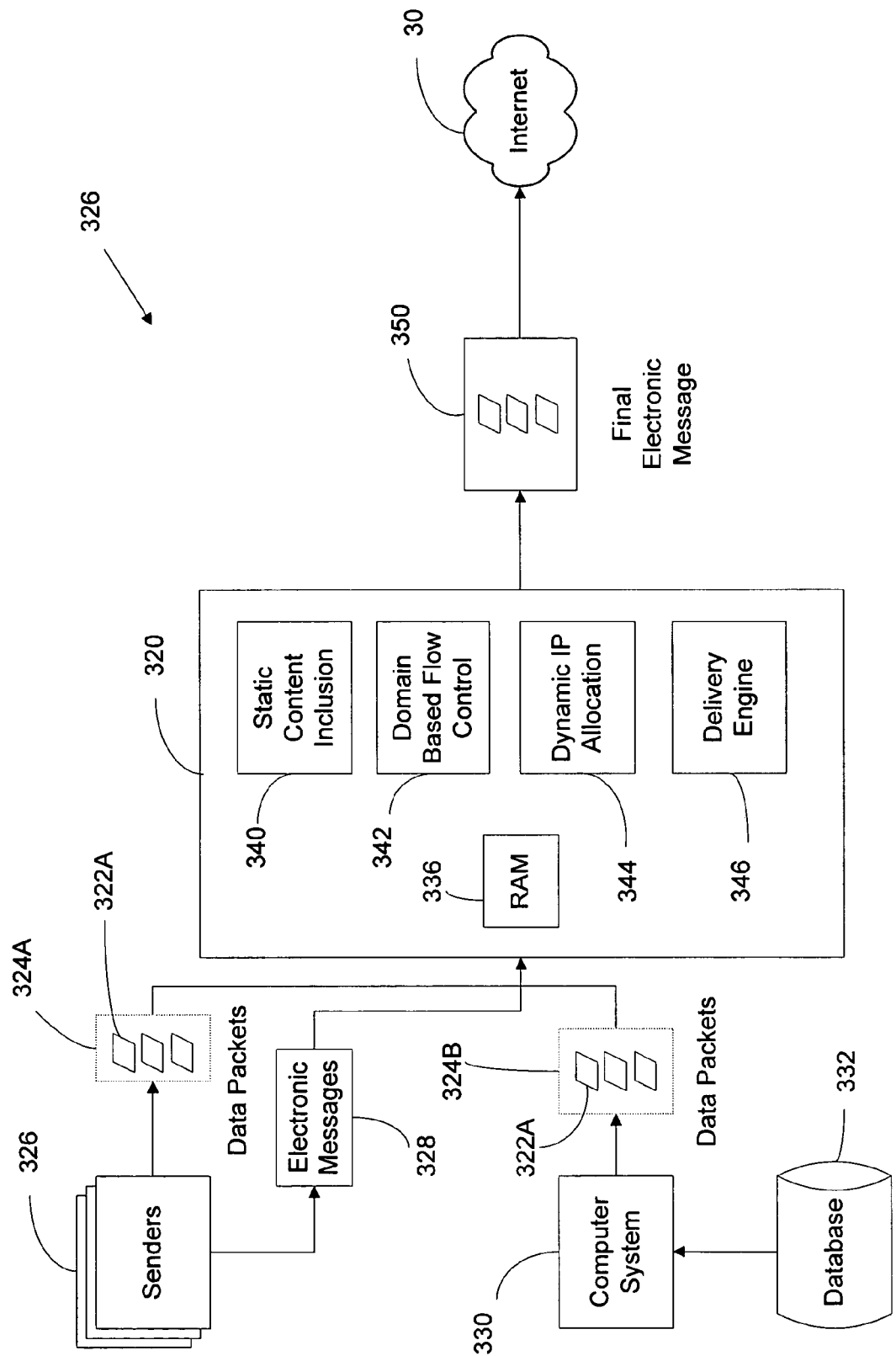
FIG. 5A is a diagrammatic illustration of a mail server system for receiving a plurality of data packets and subsequently sending an electronic message containing at least a portion of the plurality of data packets in accordance with the present invention.

Continuing to refer to FIG. 5A, Sender MTA 320 includes random access memory (RAM) 336 such that, as sender MTA 320 receives plurality of data packets 322A and 322B, the data packets so received are saved in RAM rather than as separate files on a hard drive. As a result, MTA 320 is able to perform enhancement processes such as, for example, static content inclusion 340, domain based flow control 342, dynamic IP allocation 344 and even deliverability confirmation 346, then generate a plurality of final electronic messages 350 from the plurality of data packets 322A and 322B to be directed through Internet 30.

It is emphasized that the enhancement processes in sender MTA 320 are facilitated by the fact that sender MTA 320 is configured to accept data packets into RAM rather than being solely dependent on complete electronic messages that are saved as files onto hard drives. Since the final electronic message is generated from the various data packets, electronic message delivery system 300 is referred to as a "build-and-forward" system rather than the previously described "store-and-forward" system of the prior art. The build-and-forward system provides significant advantages over the store-and-forward system because the enhancement processes included in the build-and-forward system may be handled all in RAM rather than requiring a series of file reading and re-writing as in the store-and-forward system. Also, when deliverability confirmation is included in the enhancement processes, sender MTA 320 may be configured such that it does not generate final electronic message 350 if deliverability of that final electronic message 350 is not confirmed, thus resulting in savings in processing time and communication bandwidth.

Figure 5B:
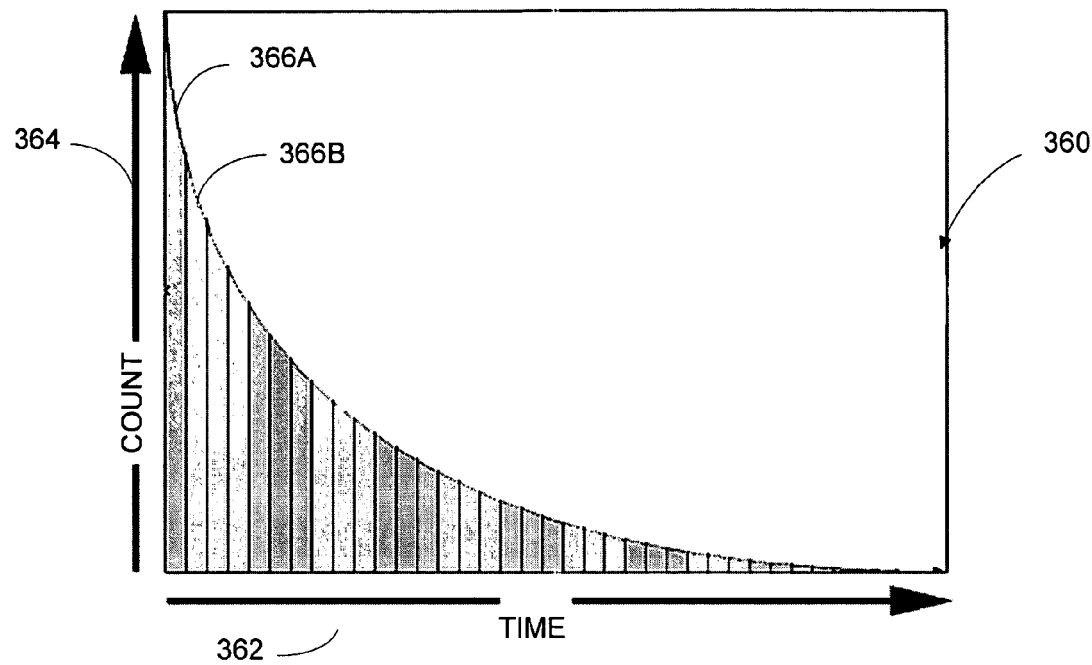
FIGS. 5B and 5C are exemplary graphs illustrating the theoretical distribution of recipient domains with and without a domain based flow control of the present invention.
Figure 5C:
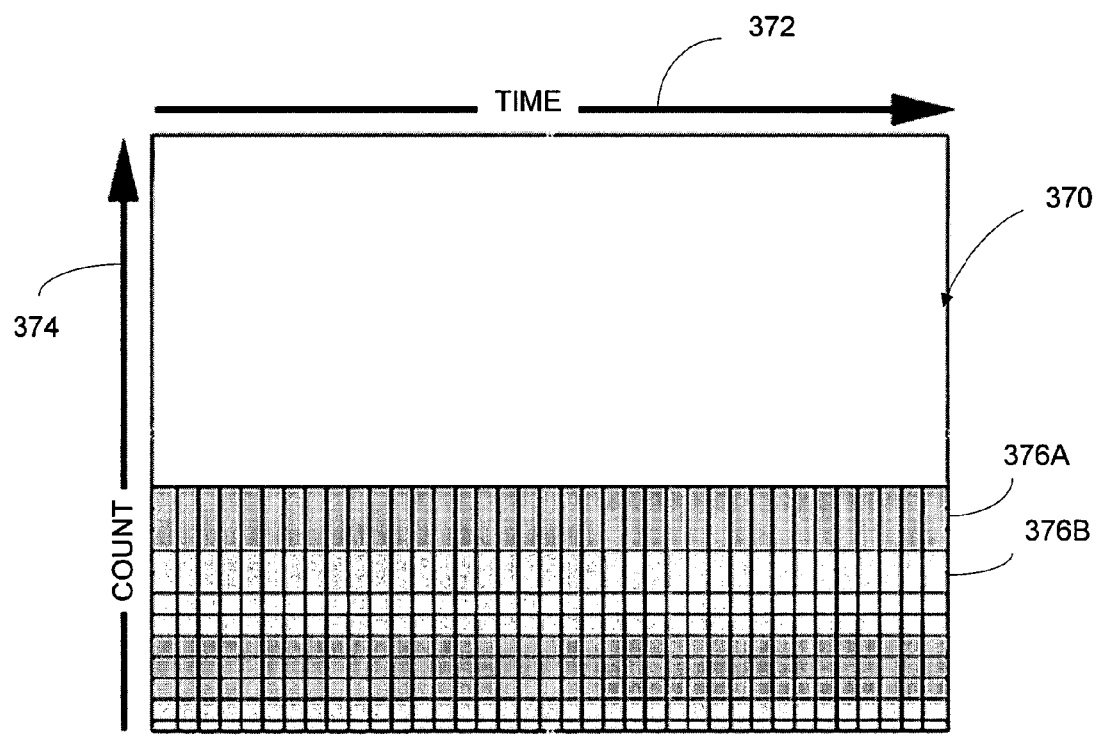

FIGS. 5B and 5C are graphs showing the typical distributions of domain names over the course of delivery of a plurality of electronic messages in a prior art system without domain name distribution and in an electronic message delivery system of the present invention including domain name distribution. First considering FIG. 5B, in typical batch processing of electronic messages, for example in bulk e-mail sending environments, there tends to be a large number of e-mail messages being sent to a handful of large internet service provider domain names. For example, a majority of the e-mail messages may be intended for recipients interfaced through major providers such as AOL™, MSN™, HotMail™ and Yahoo™. In FIG. 5B, which shows a graph 360 with time represented along x-axis 362 and message count along y-axis 364, each of vertical bars 366A, 366B, etc., represents the number of e-mail messages directed to a particular domain at a given time. Due to the concentration of a majority of recipient addresses in a few domain names, the domain name distribution in the delivery attempt tends to be quite uneven over time. In the example illustrated in FIG. 5B, graph 360 represents a case in which the sender MTA (or the e-mail message generating database) tends to group together the e-mail messages directed to a particular domain name. For instance, the sender MTA may begin by directing a large number of e-mail messages to AOL™ (as represented by vertical bar 366A), then to MSN™ (as represented by vertical bar 366B) and so on over time to domains of smaller ISPs. As a result, the sender MTA must send out a large number of e-mail messages during the initial send time period, then smaller numbers as time progresses, such that the processing capacity of the sender MTA is utilized unevenly over time and delivery speed and performance suffers. Moreover, certain providers have filtering capabilities which prohibit the reception of a large number of e-mail messages from a single sender MTA over a short time span.

In contrast, FIG. 5C shows a graph 370 of message delivery with domain based flow control in accordance with the present invention, again with time represented along x-axis 372 and message count along y-axis 374. In graph 370, delivery of electronic messages to each domain is distributed over time such that each horizontal bar 376A, 376B, etc., represents the number of e-mail messages directed to a particular domain at a given time. As can be seen in FIG. 5C, the number of messages directed to a particular domain is evenly distributed over time such that the delivery speed and performance of the sender MTA of the present invention are greatly improved over the prior art. Also, the even domain distribution alleviates the problem of the message delivery being blocked at a particular domain due to the high volume message delivery. The domain name distribution is enabled by feature of sender MTA 320 of FIG. 5A to accept data packets containing the building blocks of an e-mail message. That is, unlike prior art MTAs, sender MTA 320 is able to manipulate the components of an e-mail message before the final electronic message is generated so as to perform such tasks as domain based message distribution and flow control. Due to the capability of the MTA of the present invention to deal with data packets rather than complete electronic message files, the incorporation of such additional processing steps into the message delivery process itself is greatly simplified. Applicants submit that this feature is particularly advantageous in large volume and/or bulk messaging environments.

Figure 5D:
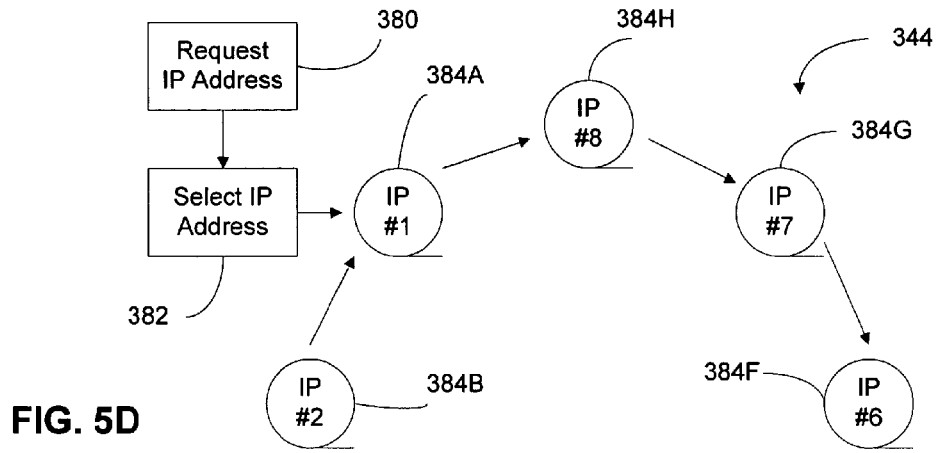
FIG. 5D is a diagrammatic illustration of a dynamic IP selection process suitable for use in the mail server system of the present invention.

FIG. 5D illustrates the details of dynamic IP allocation 344 of FIG. 5A. As shown in FIG. 5A, dynamic IP allocation 344 begins with a request for IP address step 380, followed by a select IP address step 382. In the embodiment illustrated in FIG. 5A, select IP address step 382 includes rotating through IP addresses #1-#8 (indicated by circles 384A-384H) such that consecutive outgoing messages do not have the same originating IP address. Applicants submit that this feature is particularly advantageous in large volume message delivery.

Figure 6A:
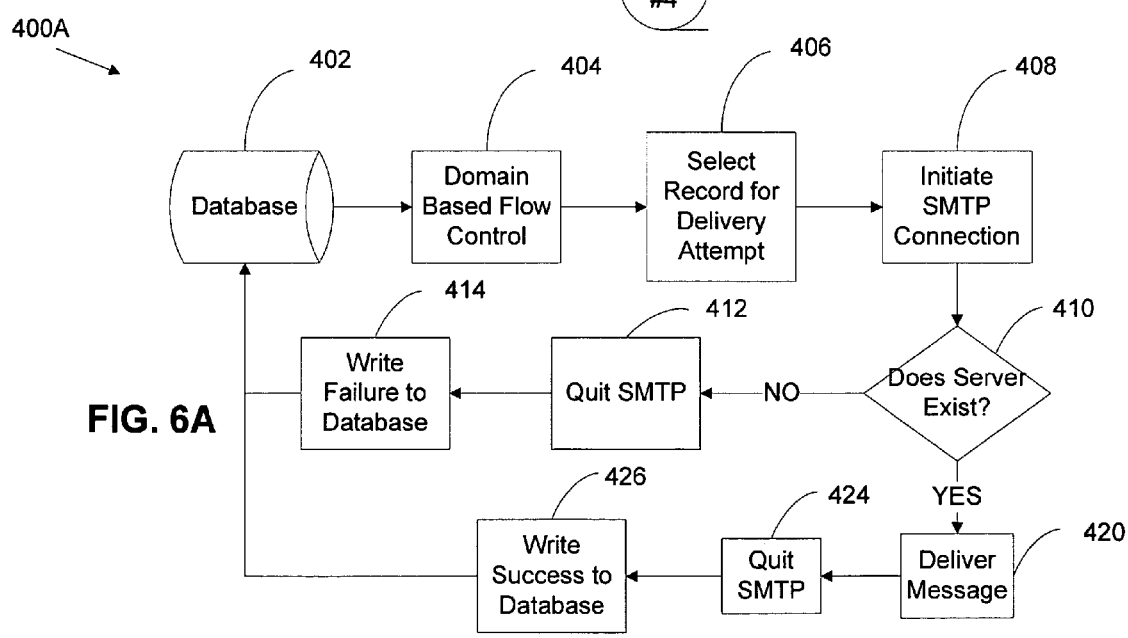
FIGS. 6A and 6B are flow chart diagrams illustrating possible embodiments of a recipient server information verification process in accordance with the present invention.

FIG. 6A is a flow chart illustrating the steps of electronic message delivery process including domain based flow control, recipient server availability confirmation and database feedback loop in accordance with the present invention. In particular, a process 400A as shown in FIG. 6A includes the confirmation and delivery steps taking place through a single SMTP communication. Process 400A is initiated from a database 402, from which information (i.e., data packets) regarding a particular e-mail message, or a plurality of e-mail messages, is extracted. In process 400A, the data packets are directed from database 402 to a domain based flow control step (shown as a box 404), which provides the domain based flow control as described above in reference to FIGS. 5A-5C. Following the domain based flow control step, a particular set of data packets, or record, is selected for delivery attempt in a step 406. An SMTP connection is then initiated in a step 408. Once an SMTP connection has been established, a decision 410 is performed to determine whether or not the recipient server exists (i.e., confirmation). If the result of decision 410 is NO the recipient server does not exist, then process 400A proceeds to quit the SMTP connection in a step 412, then logs the delivery failure to database 402 in a step 414. If the result of decision 410 is YES the recipient server does exist, then process 400A proceeds to deliver the e-mail message to the recipient server in a step 420, quits the SMTP connection in a step 424, then logs the successful delivery to database 402 in a step 426. In this way, domain based flow control, recipient server availability confirmation and database feedback are all accomplished within a single process through a single SMTP connection.

Figure 6B:
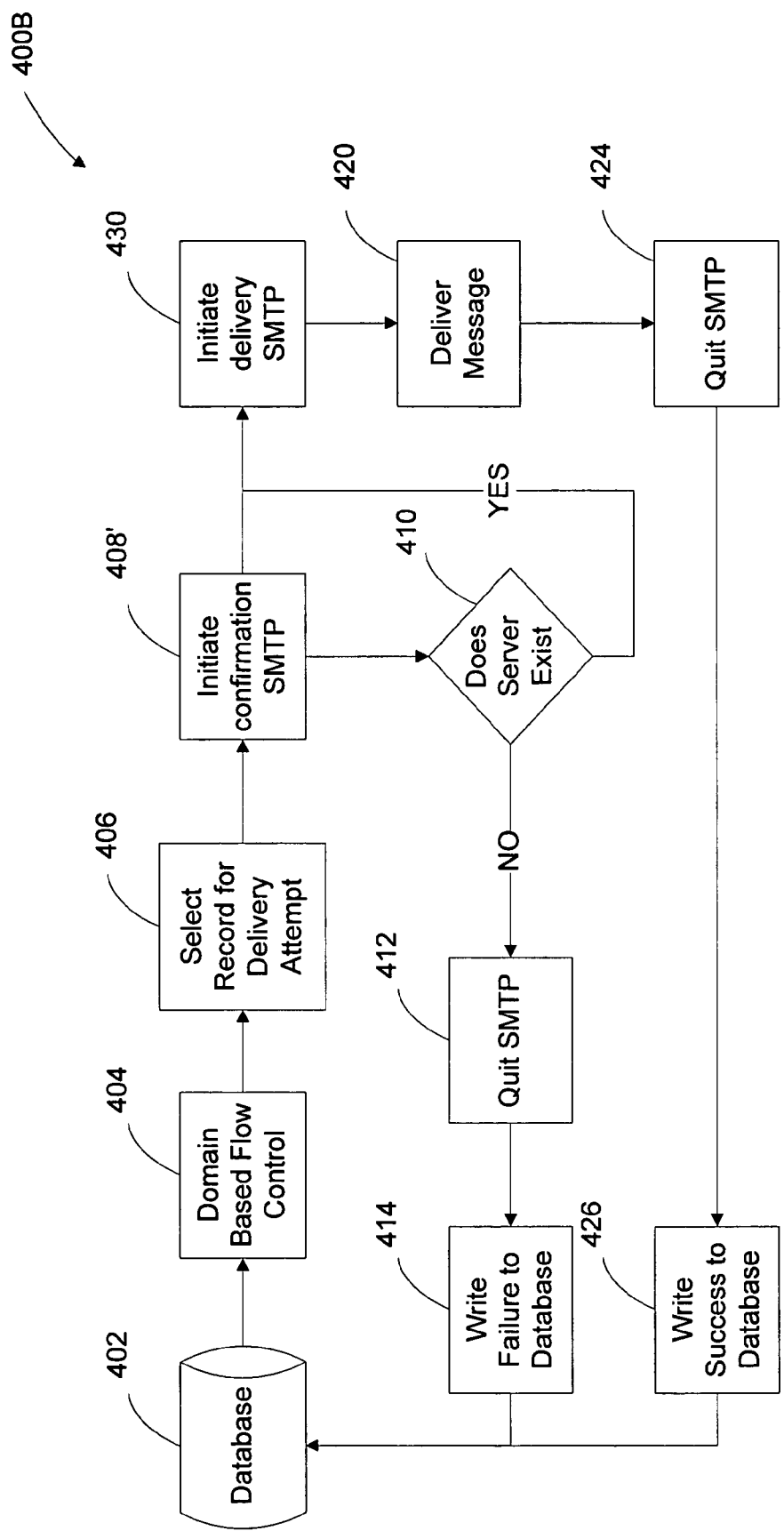

Referring now to FIG. 6B in conjunction with FIG. 6A, FIG. 6B is a flow chart illustrating the steps of an alternative electronic message delivery process including domain based flow control, recipient server availability confirmation and database feedback loop, also in accordance with the present invention. A process 400B as shown in FIG. 6B includes the confirmation step through a confirmation SMTP handshake and the delivery step taking place through a separate, delivery SMTP communication. Like process 400A shown in FIG. 6A, process 400B is initiated from database 402, and data packets from database 402 are directed through steps of domain based flow control 404 and selection for delivery attempt 406. Then an SMTP connection for the purposes of deliverability confirmation is initiated in a step 408'. As in process 400A, step 408' is followed by decision 410 to confirm whether or not the recipient server exists. As before, if the result of decision 410 is NO the recipient server does not exist, then the SMTP connection is terminated in step 412 and the delivery failure is logged to database 402 in step 414. Unlike in process 400A, however, if the result of decision 410 is YES the recipient server does indeed exist, then process 400B proceeds to initiate a second, delivery SMTP connection in a new step 430. Message delivery step 420 is performed through this delivery SMTP connection rather than through the same SMTP connection as the confirmation SMTP established in step 408'. This process of establishing separate SMTP connections for the confirmation and delivery steps is advantageous in instances where it is desirable to determine deliverability prior to initiating the server connection.

Figure 7A:
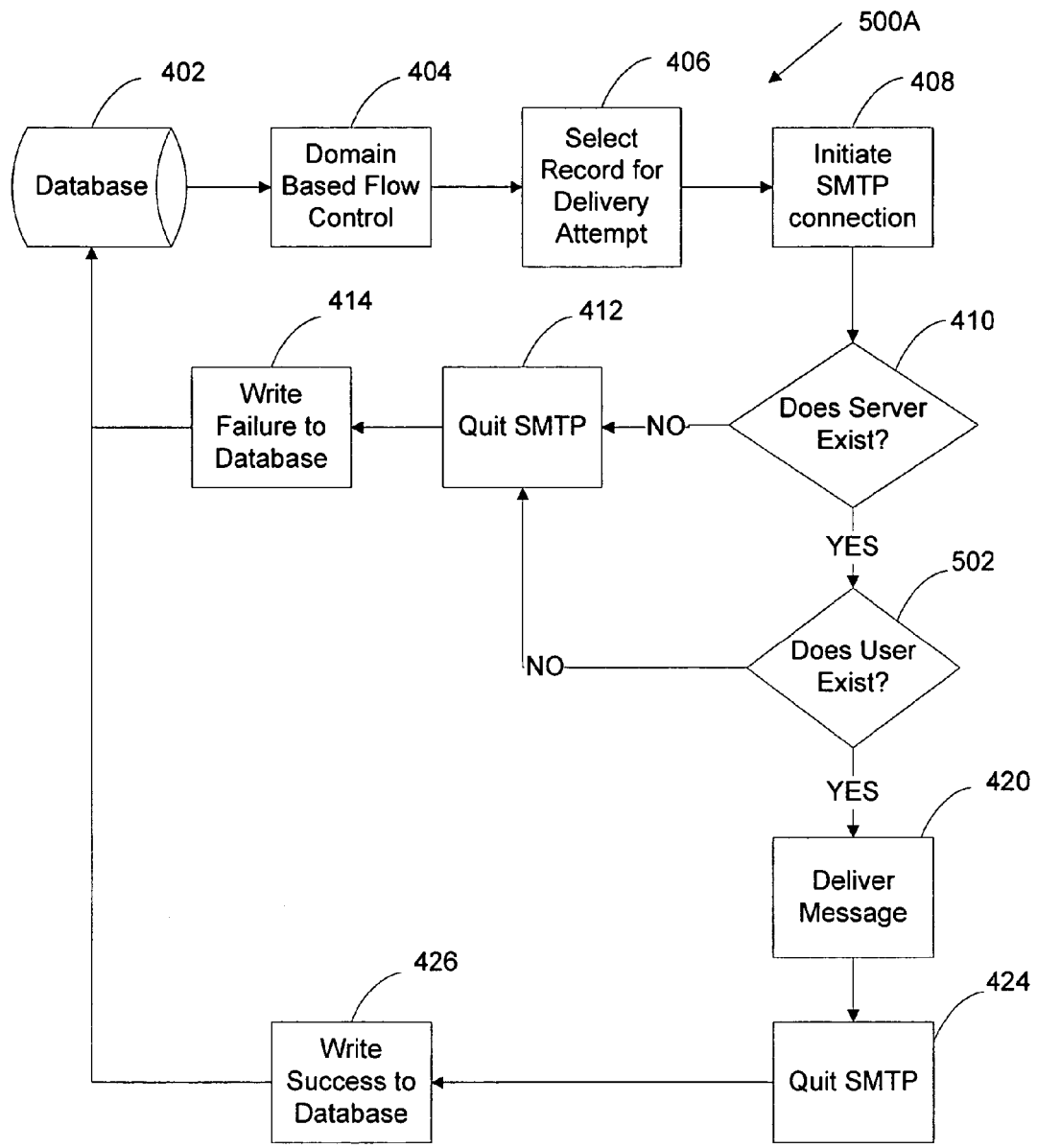
FIGS. 7A and 7B are flow chart diagrams illustrating possible embodiments of a recipient server information and recipient information verification process in accordance with the present invention.

Referring now to FIG. 7A in conjunction with FIG. 6A, FIG. 7A is a flow chart illustrating the steps of electronic message delivery process including domain based flow control, deliverability confirmation (including confirmation of recipient server availability and recipient information validity) and database feedback loop in accordance with the present invention. As in process 400A of FIG. 6A, a process SODA as shown in FIG. 7A includes the confirmation and delivery steps taking place through a single SMTP communication. In addition to all of the steps included in process 400A, process SODA further includes a decision 502, following decision 410, to determine whether or not the intended recipient (i.e., user) exists on the recipient server. In other words, decision 502 determines whether the recipient information, as provided by database 402, is valid. If the result of decision 502 is NO the user does not exist on the recipient server, then process 500A reverts to the steps of terminating the SMTP communication and writing the delivery failure to database 402 (steps 412 and 414 as shown in the figures). In this way, process 500A provides the additional deliverability confirmation step of recipient information validity in addition to the recipient server confirmation step as provided in process 400A of FIG. 6A.

Figure 7B:
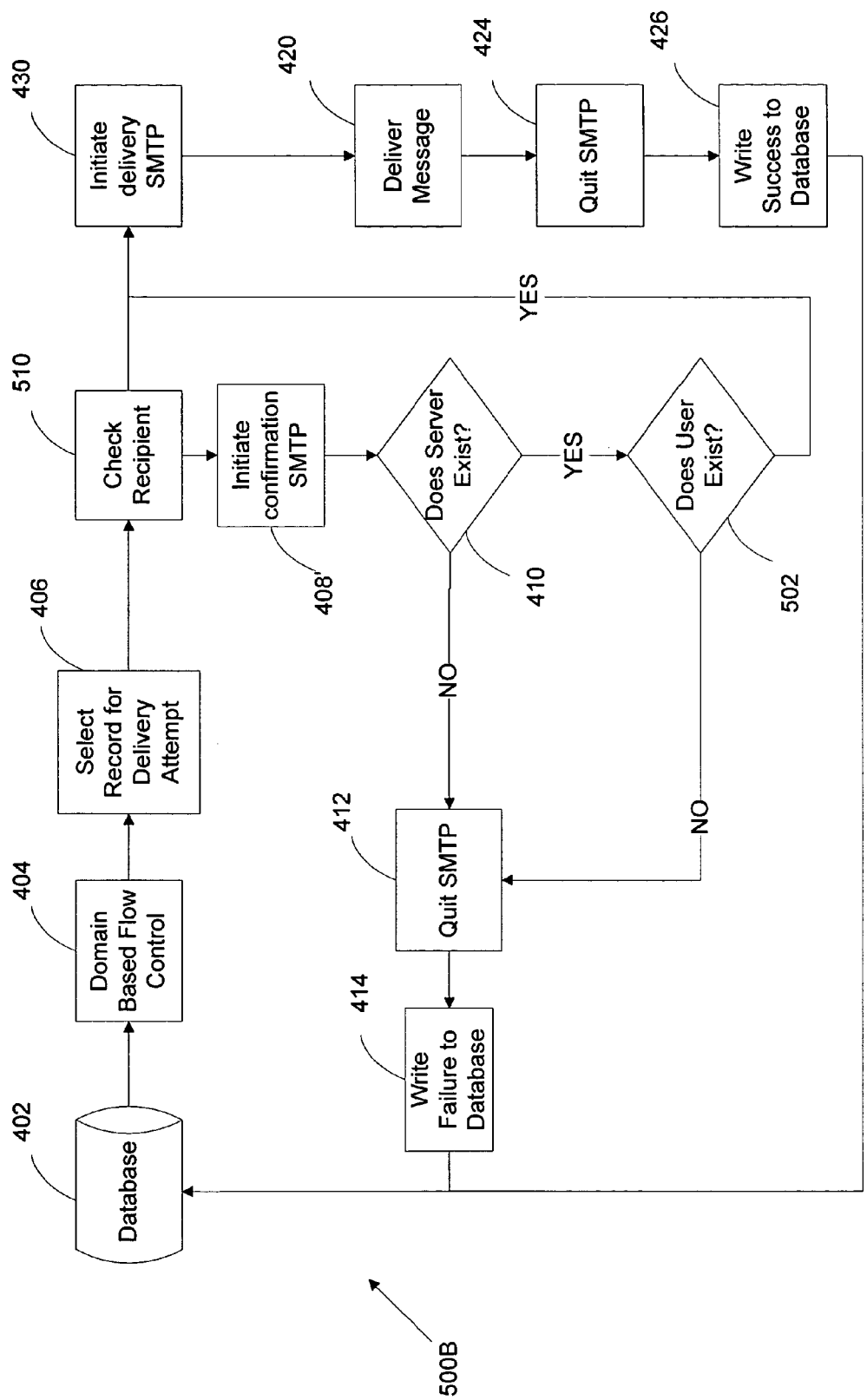

Similarly, FIG. 7B illustrates a variation of process 400B as shown in FIG. 6B. FIG. 7B is a flow chart illustrating the steps of an alternative electronic message delivery process including domain based flow control, deliverability confirmation (including confirmation of recipient server availability and recipient information validity) and database feedback loop, also in accordance with the present invention. A process 500B as shown in FIG. 7B includes the confirmation step through a confirmation SMTP handshake and the delivery step taking place through a separate, delivery SMTP communication. In comparison to process 400B of FIG. 6B, process 500B provides a separate step 510 for checking the recipient information. Step 510 includes step 408' of initiating a confirmation SMTP communication, followed by decision 410 of whether or not the recipient server exists and decision 502 of whether or not the intended recipient exists on the recipient server. Then, if the answers to decisions 410 and 502 are both YES, then a delivery SMTP is initiated in step 430 to perform the actual delivery of the message, separate from the confirmation SMTP communication.

Figure 8A:
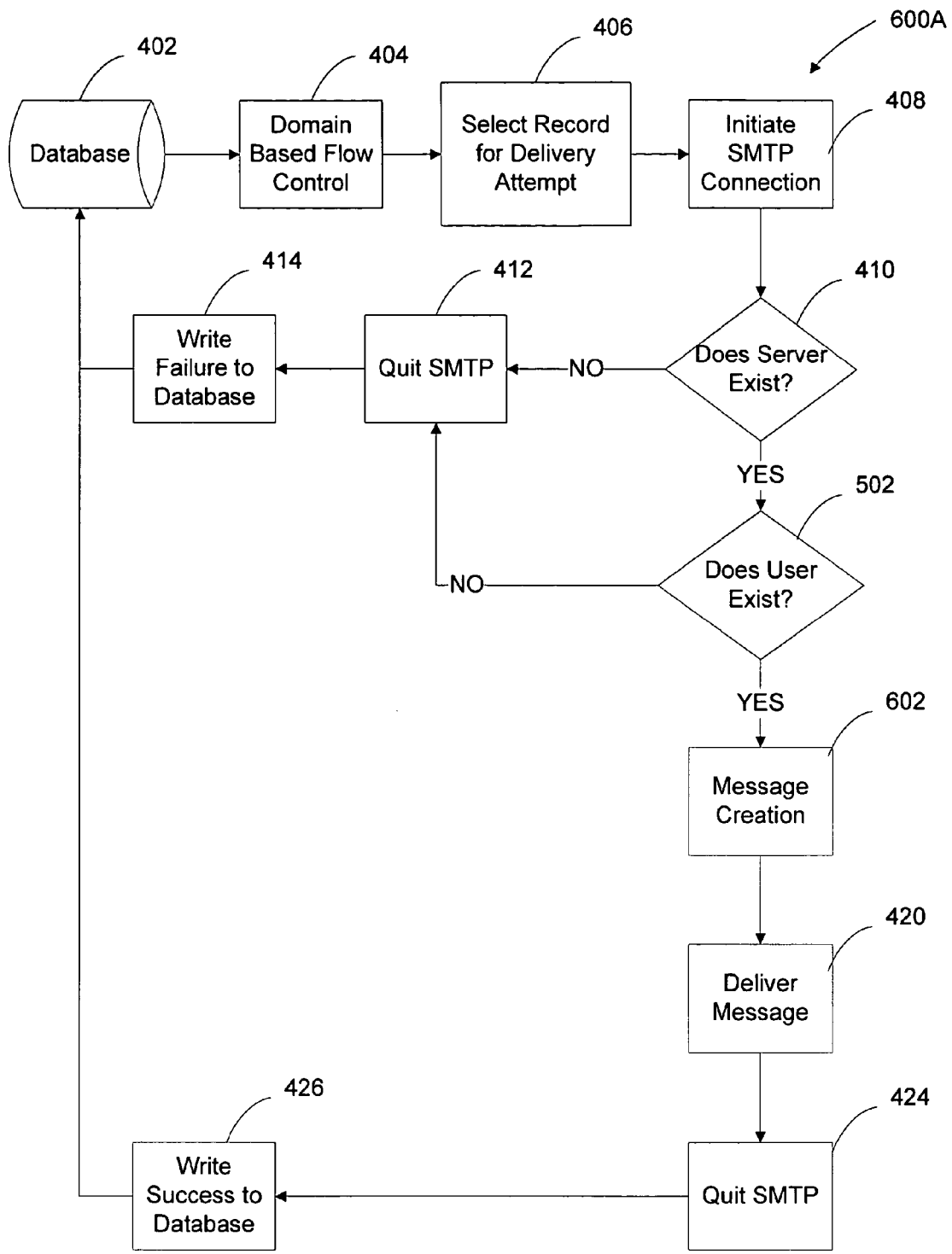
FIGS. 8A and 8B are flow chart diagrams illustrating possible embodiments of a recipient server information and recipient information verification process including late message creation in accordance with the present invention.

FIG. 8A is a flow chart illustrating the steps of yet another electronic message delivery process including domain based flow control, deliverability confirmation (including confirmation of recipient server availability and recipient information validity), late stage message creation and database feedback loop in accordance with the present invention. A process 600A as shown in FIG. 8A includes the confirmation and delivery steps taking place through a single SMTP communication. Process 600A is in essence a variation of process 500A as shown in FIG. 7A but further including a late stage message creation step 602. That is, the deliverability confirmation steps 410 and 502 are performed based solely on the data packets provided from database 402 rather than on the recipient information extracted from a pre-created e-mail message. Then, late stage message creation step 602 provides creation of actual e-mail messages only for those recipients whose deliverability has been confirmed in decisions 410 and 502, thereby reducing the memory requirements for storage of pre-created e-mail messages.

Figure 8B:
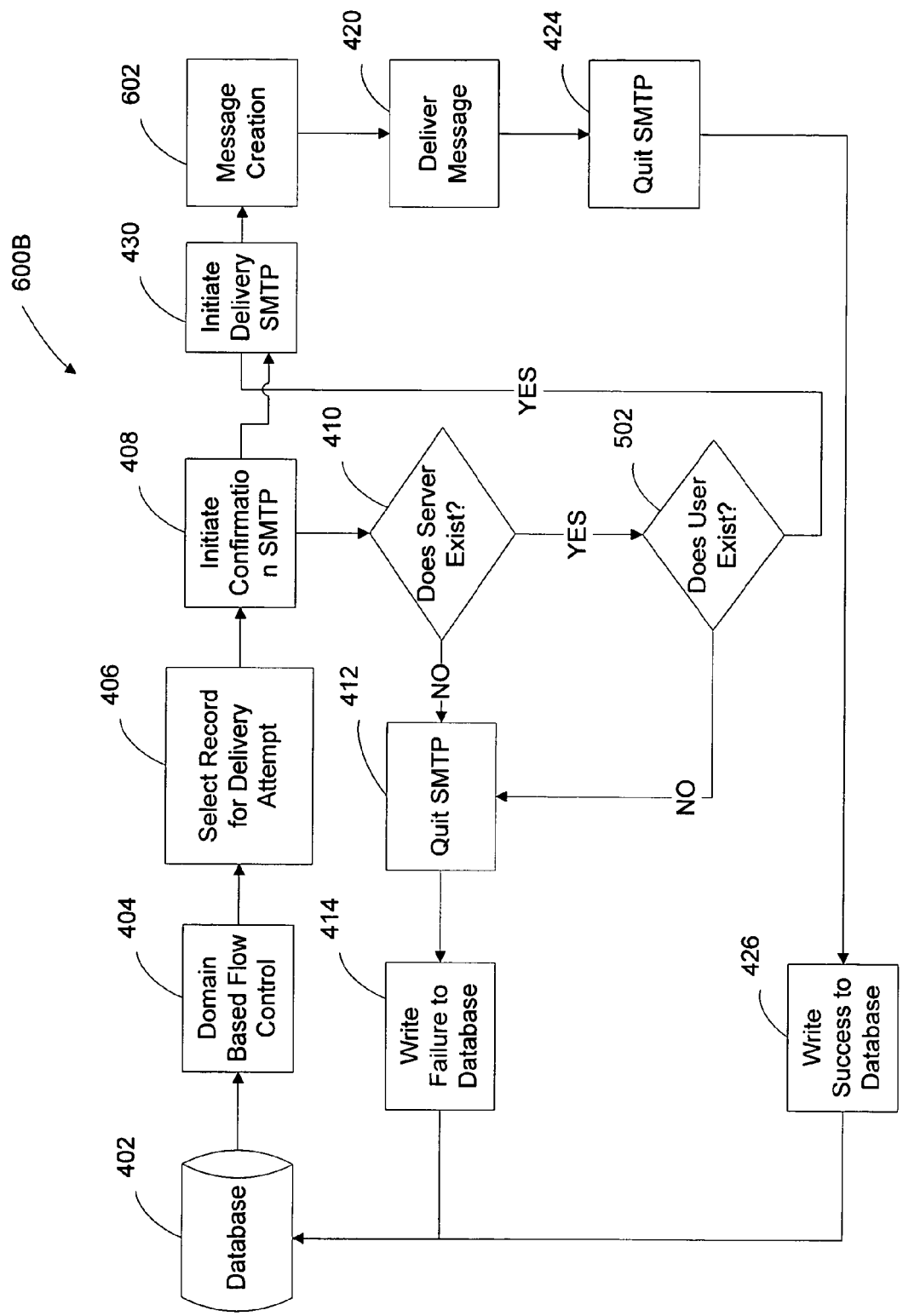

FIG. 8B is a flow chart illustrating the steps of an alternative electronic message delivery process including domain based flow control, deliverability confirmation (including confirmation of recipient server availability and recipient information validity), late stage message creation and database feedback loop, also in accordance with the present invention. A process 600B as shown in FIG. 8B includes the confirmation step through a confirmation SMTP handshake and the delivery step taking place through a separate, delivery SMTP communication. Like FIG. 8A added a late stage message creation step to process 500A of FIG. 7A, FIG. 8B essentially adds late stage message creation 602 to process 500B of FIG. 7B.

Figure 9A:
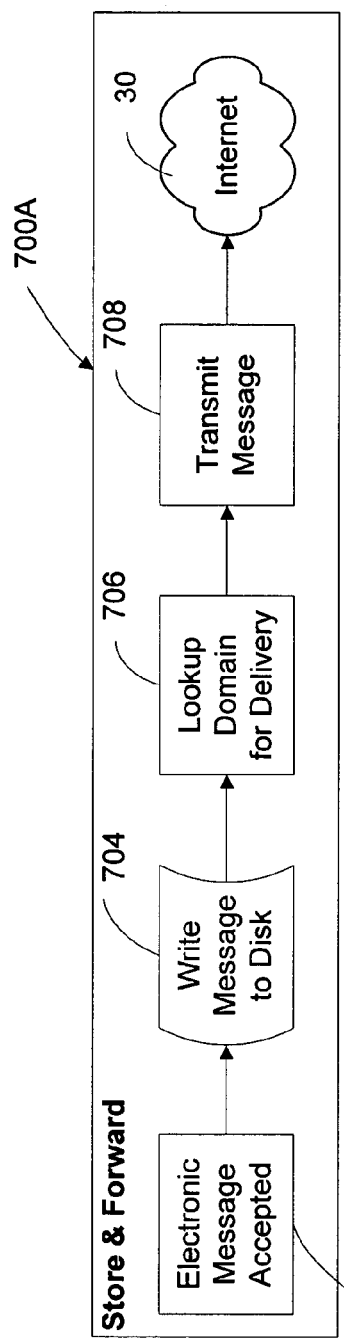
FIGS. 9A and 9B are flow chart diagrams comparing the prior art "store & forward" process with the present invention "build & forward" process of sending electronic messages through the Internet.
Figure 9B:
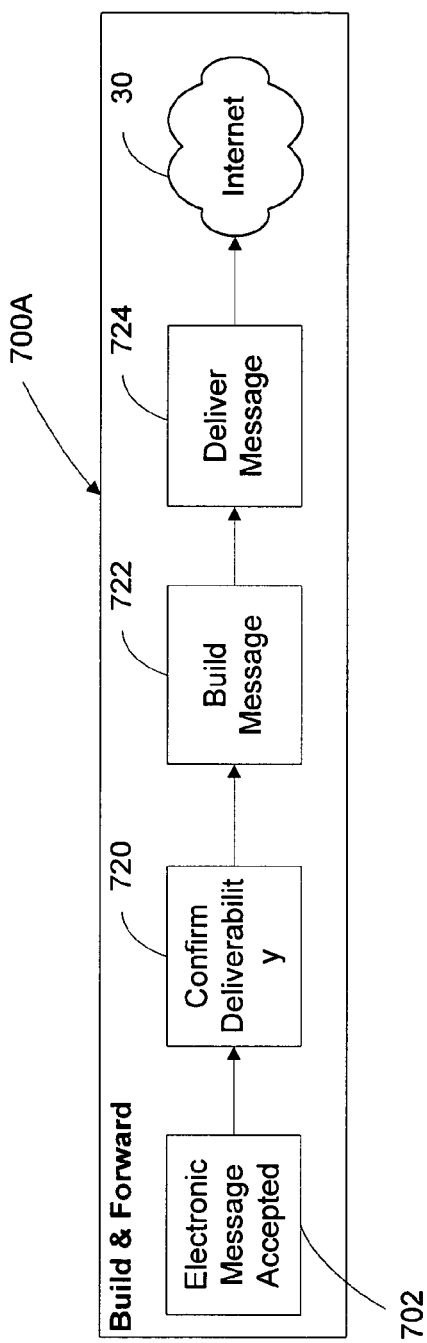

FIGS. 9A and 9B are flow charts comparing the prior art store-and-forward method of electronic message delivery versus the build-and-forward model of the present invention. FIG. 9A illustrates the prior art, store-and-forward model, as described earlier, in which the message delivery engine accepts a complete, electronic message, writes the message to disk, locates the domain name (as included in the header section of the electronic message), then directs the message through the Internet toward the intended recipient. In particular, a process 700A as shown in FIG. 9A illustrates a store-and-forward model which begins with a step 702 of accepting an input electronic message. The electronic message so received is stored as a file on a disk in a step 704. Then, in a step 706, the domain of the recipient server, as specified in the electronic message, is "looked up" through, for example, DNS lookup, then the electronic message is transmitted toward Internet 30 in a step 708.

In contrast, FIG. 9B illustrates the build-and-forward model of the present invention, in which the message delivery engine accepts an electronic message (either as a complete message or as discrete data packets), confirms deliverability of the message, then, depending on the outcome of the deliverability confirmation, builds the message for delivery through the Internet to the intended recipient. A process 700B as shown in FIG. 9B also begins with step 702 of accepting an input electronic message. However, the input electronic message is not stored as a file on disk but as data packets containing bits of information about the message. Process 700B further includes a step 720 for confirmation of deliverability, as described earlier, based on these data packets. Furthermore, in process 700B, the actual e-mail message is not built until a step 722, after the deliverability of the message has been confirmed. Process 700B then proceeds to deliver the resulting message through Internet 30.

Figure 10A:
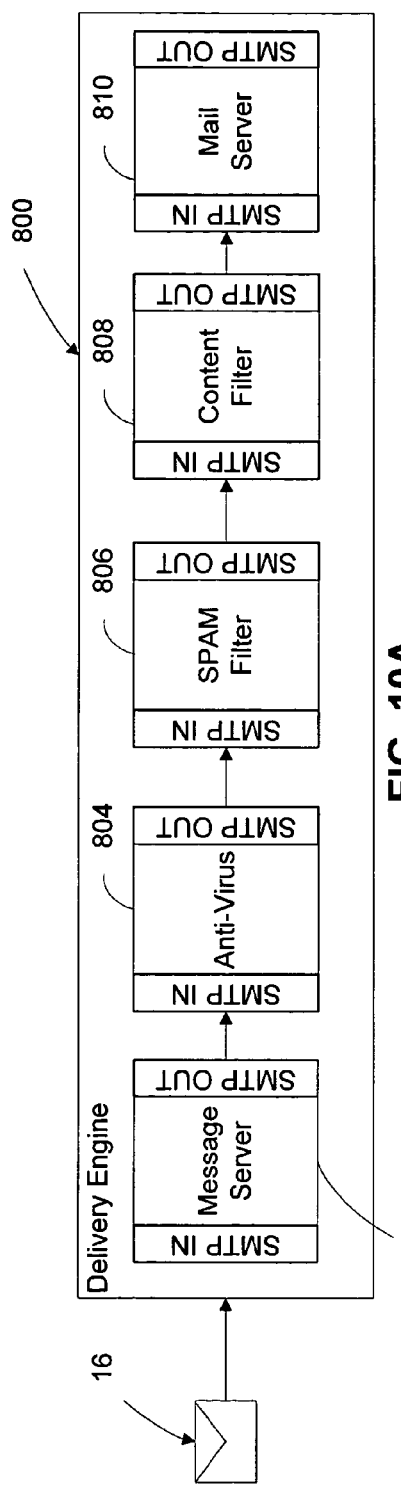
FIGS. 10A and 10B are flow chart diagrams comparing the prior art method and the present invention method for adding supplemental processes in the handling of electronic messages.
Figure 10B:
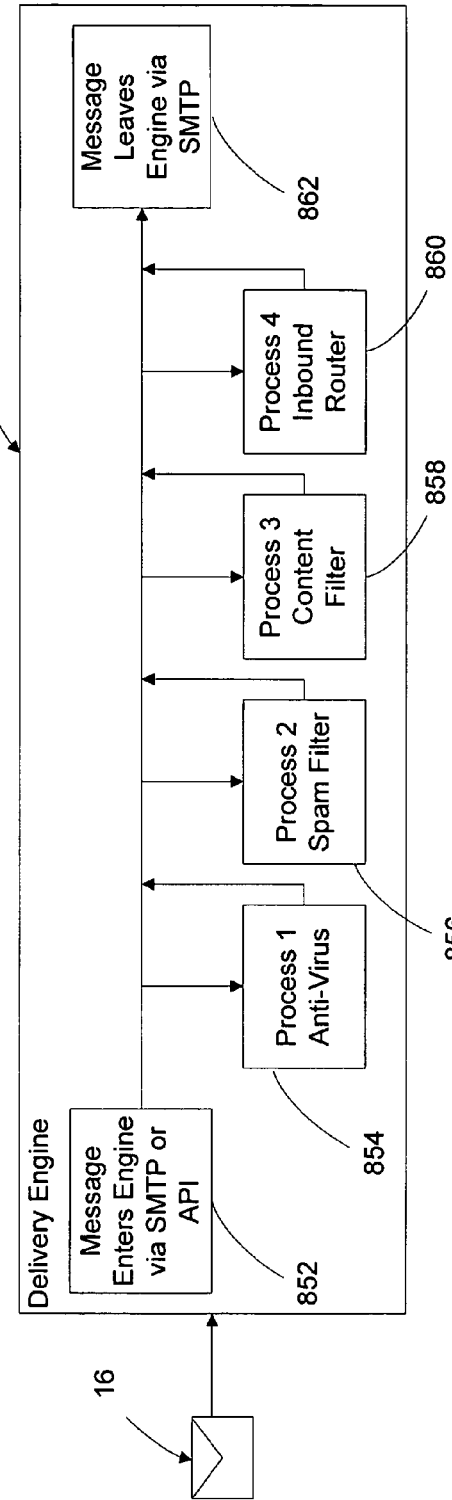

FIGS. 10A and 10B are flow charts comparing the prior art and the present invention ways in which additional processes, such as message filters, are added to the message server functionality. As shown in FIG. 10A, a prior art delivery engine accepts a complete, SMTP message at a message server 802 from a user (not shown), then directs the message by SMTP communication to, for instance, an anti-virus application 804, then by another SMTP communication to a spam filter 806, then by yet another SMTP communication to a content filter 808, then through still another SMTP communication to a mail server 810 for transmittance, by still yet another SMTP communication, toward the intended recipient. The plurality of SMTP handshake processes is cumbersome as well as time and bandwidth consuming. In contrast, a delivery engine 850 of FIG. 10B accepts an electronic message at a message server 852 either by, for instance, SMTP or by application program interface (API) from a data source as data packets, then directs the electronic message through a variety of processes, such as an anti-virus application 854, a spam filter 856, a content filter 858 and an inbound router 860, by API such that no SMTP communication between the additional processes are necessary. The message is then directed toward the intended recipient by, for instance, SMTP communication from a sender mail server 862.

The approach of the present invention in electronic message delivery is additionally discussed immediately hereinafter.

General Approach

The general approach to sending messages using this refactored architecture for SMTP message delivery includes the feeding of the server with messages for delivery, initiating the SMTP communication with the receiving server, building the message for delivery, and finally transferring the message content to the receiving server. We will address each in turn immediately hereinafter.

The server is first fed with sender and recipient information. This process can include the acceptance of a complete "well-formed" SMTP message, or a collection of data packets that will be combined in process to create the message. In the preferred implementation the input would be a collection of data packets/points for later message construction. This data would include information for the message headers, such as recipient e-mail address, subject lines, from address, etc. It would also include information for the message body. This could include text, HTML code, graphics, stored personal information from a separate data source, audio or video files, attachments or any of a number of other types of electronic data.

Once the system has the required data points for a valid SMTP connection, it initiates a connection with the receiving server. By opening a communication socket to the receiving server and beginning the normal SMTP communication, the system can determine the "deliverability" of the message. If deliverability is confirmed in the affirmative, the system builds a complete message formatted for the relevant protocol (e.g. SMTP) for delivery based on the data points provided. If deliverability is denied, the system flags the message as undeliverable and closes the connection to the receiving server.

Message delivery only occurs after a successful deliverability test, and message construction. Once these events have occurred, the message is transferred across the communication socket to the recipient server and the system closes the connection.

Description of Each of the Above Steps in Detail

If one were to follow this process in detail as it applies to an electronic message, it would progress as in the process outlined immediately hereinafter.

a) A collection of data packets that contains all the information necessary to create the desired message is accepted by the system.
b) The sending server examines the data packets for the domain name of the receiving server.
c) The sending server uses this domain name to look up the mail exchange (MX) record using the Internet Domain Name Service (DNS) interface. This process returns the actual IP address of the receiving server for this message.

d) The sending server establishes a TCP/IP socket connection to the IP address of the receiving server
e) Upon connection, the receiving server sends an announcement of itself
f) The sending server issues a "HELO" command with its' name as the argument.
g) The receiving server then verifies that the sending server is valid and able to send e-mail into its system. If accepted, the receiving server will respond with a "250 Welcome" command. If the connection is refused, the reviving server will respond with a "500 connection refused" command.
h) At this point the sending server will announce who is sending the e-mail with a "MAIL FROM: senderprefix@ sernderdomain.com" command.
i) Once again, the receiving server verifies that the sender's address is allowed to deliver e-mail into the receiving server. If the e-mail is acceptable, the receiving server responds with a "250 Okay" command. If the message is not acceptable, the receiving server responds with a "500 Not allowed" command.
j) At this point the sending server sends the "RCPT TO:recipientprefix@recipientdomain" command to tell the receiving server who is to receive the message.
k) The receiving server verifies the recipient address, checking that it is an active address within the domain and available for receiving a message. If the recipient address is valid and available, the receiving server will respond with a "250 Okay" command. If the recipient address is not valid, the receiving server will respond with a "500 User unknown" or other user availability failure command.
l) It is at this point in the process where the invention departs from the current state of the art. Once the verification transactions in the SMTP conversation have occurred, the sending server will, in the case of positive verification of deliverability, build the message and continue the send process, or, in the case of a deliverability failure error, write the failure to a record log, discontinue the process and close the connection.
m) In this new process, once a message is built, the sending server then sends the "DATA" command.
n) If the receiving server is ready to accept the message, it will send a command in the format "250 Okay"
o) Once the sending server has the aforementioned okay, it will send the full message content to the receiving server, ending with a "<cr><lf>.<cr><lf>" character sequence. This string will inform the receiving server that the message is complete.
p) If the receiving server accepts the message it will send another "250 Okay" command.
q) Once the final okay is received, the sending server issues a "QUIT" command, and upon receipt the receiving server will disconnect the socket and both side will close communication.

Optional Additional Features
Build-and-Forward (Data Packet-Based)

Build-and-forward messaging is comprised of three major steps. The first, and most important, is the ability to accept data packets containing recipient, delivery and message content information and store them in Random Access Memory (RAM), rather than writing them to a hard drive, while an SMTP communication is established to send a group of messages. The second key feature is to hold a single copy of the main e-mail content (body and certain headers), while processing large volumes of unique recipient data packets containing delivery and other personalized information. The third step in a "build and forward" process is to merge the e-mail content with each recipient's unique delivery and other personalized information, after the SMTP connection is established and deliverability has been determined and before (or during) transmission to the receiving server.

Message Handled in Memory (Written to RAM, not Disk)

A key feature of this system is the handling of messages in electronic memory. This is done with addressable RAM resources, rather than file I/O. By using this resource, rather then the typical hard drive of a system, the bottleneck associated with file I/O as well as the single point of failure common to the prior art may be reduced.

Dynamic IP Address Allocation

Dynamic IP address allocation is employed to spread the delivery load across a much wider address space. This allows for faster delivery and reduces the likelihood that the messages being delivered at volume will be seen as unsolicited commercial mail.

Serial Approach (Handshake/Send for Each Recipient) Vs. Parallel Approach (One Confirmation Connection, a Different Delivery Connection)

This deliverability confirmation step can be taken in a serial fashion, i.e. one step after another utilizing the same socket connection, or in parallel to the actual delivery. Both approaches have merit, and result in the same conclusion.

Sender May be Human or Application/Machine

Since the primary acceptance method for this system is Data, rather then well-formed SMTP messages, the originator may be either human or a computer system. The use of this Data driven implementation does not preclude the use of SMTP messages, but rather, extends the compatibility.

Data Driven Support

By breaking down the message transfer into distinct data packets, the system can interface with existing and future applications, as well as expand the possibilities of message enhancement during the message delivery process, as opposed to before delivery.
  a) API connection with various software, features: By establishing an API "chain", each message can be handed to a modifier application. Such applications might serve functions for virus protection, SPAM filtering, content management, etc.
  b) Triggered e-mail: As messages are composed of data packets in the proposed system, this system lends itself to the modification and delivery of e-mail that is driven by database triggers. Database triggers occur when specified criteria are met in the database. The database can the "trigger" an event such as the delivery of an e-mail. By exposing the message process to data packets are building messages late in the delivery process, triggered messaging becomes practical.
  c) Monitoring of outbound messages and events: In addition to the added functionality that data driven messaging can provide, this data approach allows the administrator of the system to monitor and control all messaging activities within the system. From a simple count of the number of messages, to advanced API chain management.

Domain-Based Flow Control

Domain-based flow control is achieved by looking at the complete group of e-mail domains that are scheduled for delivery and "normalizing" the distribution so that no single domain can block delivery of the other domains. As is well known in the art, any list of e-mail addresses is composed of a majority of the large ISP's, then filled out with the rest of the smaller service providers. In a typical list sending scenario, the e-mails are delivered in groups based on domain name. If one or more of the large ISP's has difficulty accepting mail or slows down, the remaining portion of the list will wait for the pervious mail to be sent. (classic FIFO behavior) This behavior clearly limits a systems ability to deliver large volumes of mail quickly. Domain based flow control is achieved by dividing each domain into equal size portions and delivering based on these groups rather then a strict domain ordering.

In-Bound Message Reception

As well as the data driven nature of the system, it will also allow messages to be into the system using a standard SMTP protocol. This allows expanded functionality as described further.

Data Feedback into the Database, According to Handshake/Delivery Results

A powerful feature of this system is the ability to log bounces and failures in the mail delivery without actually sending the e-mail. This is accomplished by logging the response from the receiving server before message creation and delivery.

Data Driven Support

Another aspect of the system is the ability to handle one or more data sources as input for each message. This capability frees the standard mail server from the previous art notion of "mail relay", instead creating a message factory within the mail delivery system.

Macro Replacement Fields, Enhanced E-Mail, Personalization, Modification of Content The advancement mentioned above, enables each message to contain personalized data pulled from disparate data sources and built into the message via custom business logic, or standard macro replacement. This provides infinite flexibility in the message creation process and is in stark contrast to the previous art.

Architecture Flexibility

A key feature if the proposed system is the ability to extend and expand the mail system architecture. By allowing an "in-line" API to messages traveling within the system, messages can be enhanced, modified or manipulated without the serial approach common in the previous art. This process acts as follows:
  i. A message is accepted into the system
  ii. The initial message related processing occurs
  iii. The message is handed to "queue manager" which will allow ordered processing of the API chain
  iv. The message is then handed to each API process registered within the system
  v. Once the message has traversed the API chain it continues its delivery path.
  vi. Then the message is then delivered to the final recipient.

Other Message Delivery Protocols

In addition to the e-mail messaging protocol discussed to this point, it should be noted that this system can be used to enable all of the mentioned features for other current, or future internet protocols. This includes SMS (Simple Messaging Service), and various other protocols that are currently available or may be developed in the future.

Adaptation for Use as In-Bound/Out-Bound MTA

In addition to expanded protocols, this system can be turned to face the inside of a network to allow inbound message handling with the same advances in the art. As a feature of inbound processing or message relay, the system could be configured to attempt retries on messages where deliverability can be wholly determined, or a message is clearly instructed to re-send at a later time. This system can also be expanded to act as a true messaging relay to increase the performance and capabilities of the pervious art.

Additional Modifications

API Event Management and Distribution

One example of prior art API process is the aforementioned MILTER process. Referring to FIG. 1A, a prior art, MILTER API event management and distribution process 900 within a prior art mail server is described. In the following description, an application is defined as any piece of computer code that is written to interface with the API, and a listener is defined as an API interface embedded into the system. Process 900 is triggered within mail server 902 when an API event is executed within the mail server in a step 906. Following the execution of an API event in step 906, the mail server then scans for listeners for that API event in a step 908. A decision 910 follows step 908 to determine whether API listeners have been found. If the answer to decision 910 is YES, one or more API listeners are discovered for that event, then the message is passed to the first randomly selected listener in a step 912. The first listener may act upon the message object in a step 914 by changing it, deleting it or letting it pass through unmodified. In a step 916, this first listener sends a response to the mail server. This response may include, for example, a result code for the mail server to pass back to the initiating, sender server. If additional API listeners have been found, the message object is then passed onto a second listener in a step 918, and steps 912 through 916 are repeated with the second listener. The process is repeated until all of the API listeners have acted upon the message. The mail server then sends a response to the initiating, sender server in a step 920 in accordance with a prescribed messaging protocol, and the process proceeds to the next message event in a step 922.

Figure 11A:
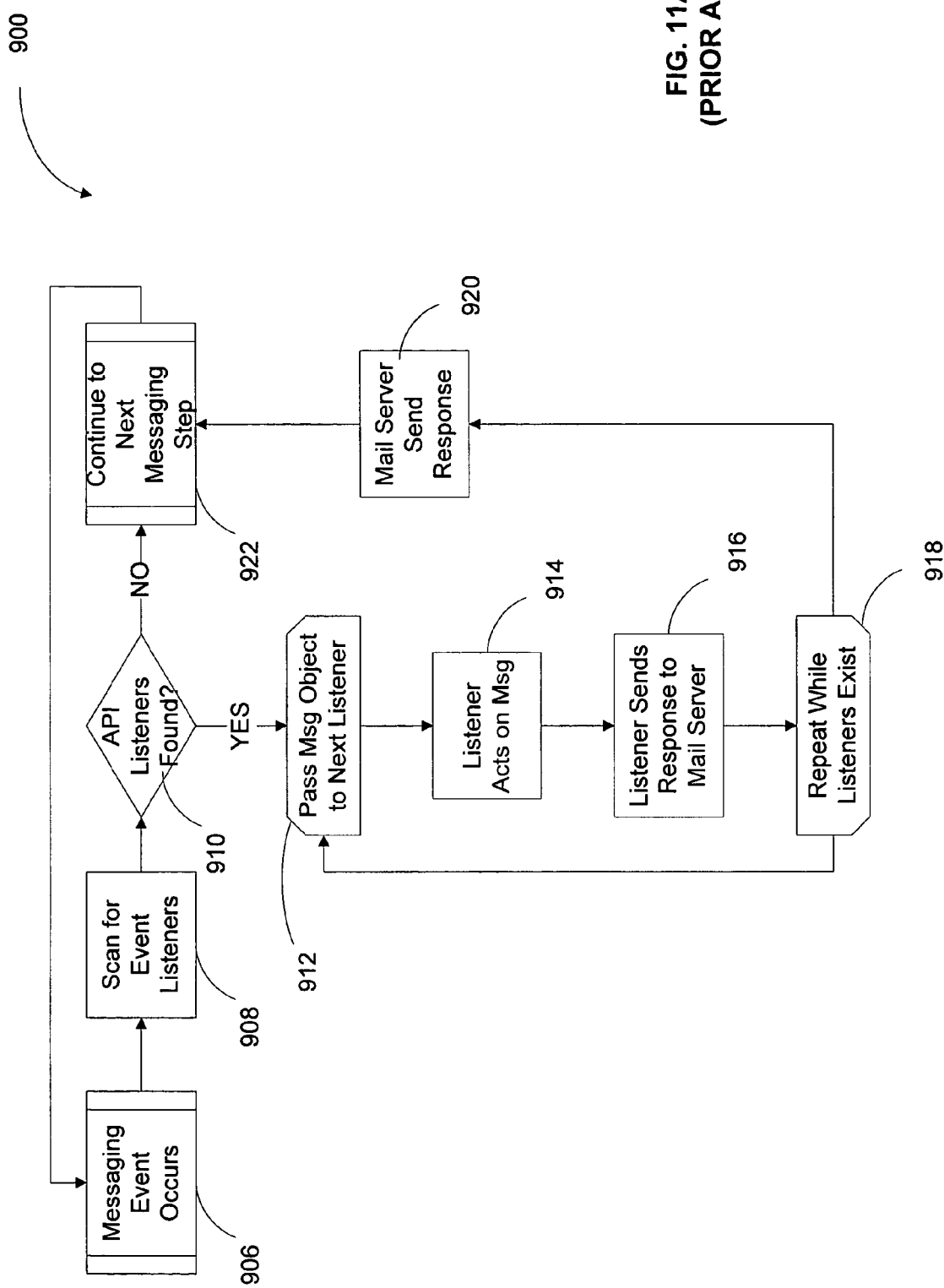
FIG. 11A is a flow chart diagram illustrating a prior art, MILTER API event management and distribution process.

While the aforedescribed MILTER architecture enables interfacing of the MTA with external applications for various types of processing, the limitations of MTA performance, architecture and features have limited the nature of MILTER architecture applicability. Specifically, the MILTER interface is commonly used to interface a single e-mail processing application (e.g., a virus filter) with an MTA for the purpose of leveraging the MTA as a mail relay mechanism for the application. Where more than one such application (e.g., a virus filter and a spam filter) is required for a network or system, multiple MTAs are deployed in sequence, feeding messages one to another as shown in FIG. 11A.

The prevalence of this problematic, sequential processing scheme is largely due to MTA limitations in the current art that include slow processing speed, inefficient use of hardware resources, inefficient data traffic management, lack of efficient queuing methods for messages awaiting processing in the context of multiple available processes and the lack of a means for ordering messages as they travel through multiple processes. These limitations combine to create unacceptable risks of overuse of available system resources, traffic bottlenecks and potential system failure when multiple API processes are implemented in a single instance of an MTA. Therefore, in the current state of the art, such processes are almost always applied serially, by sending each message through a separate application supported by a receiving MTA to accept messages and a separate, sending MTA to forward them on to the next processing application or the primary MTA for delivery through the Internet (as exemplified, for example, by delivery engine 800 in FIG. 11A). Consequently, the delivery efficiency of the entire system is limited by the delivery efficiency of the layers of serial processing through multiple MTAs and processing applications. This sequential architecture is also hardware and support intensive.

As an alternative to the API feed process of the present invention as described in conjunction with FIG. 10B, may be modified such that multiple applications may register for any message event, simultaneously specifying an execution order. At the same time, the API process of the present invention may leverage performance improving methods including, but not limited to, the socket channels and selector method for data transmission, event queuing mechanisms for optimizing flow of messages between processes and message compression for improving processing efficiency for messages that are large in size. Details of the API process of the present invention are described in detail immediately hereinafter.

It is known that the delivery process of an electronic message using SMTP protocol includes a plurality of message events such as, for example, Connect, HELO, MAIL FROM, RCPT TO, DATA and QUIT. In the API process of the present invention, the API application may register for these message events anytime during the delivery process. In other words, registration may occur at instances Post_Connect, Post_HELO, Post_MAIL, Post_RCPT, Post_DATA, Post_QUIT, Msg_Injector, Pre_Connect, Pre_HELO, Pre_MAIL, Pre_RCPT, Pre_DATA and Pre_QUIT.

Figure 11B:
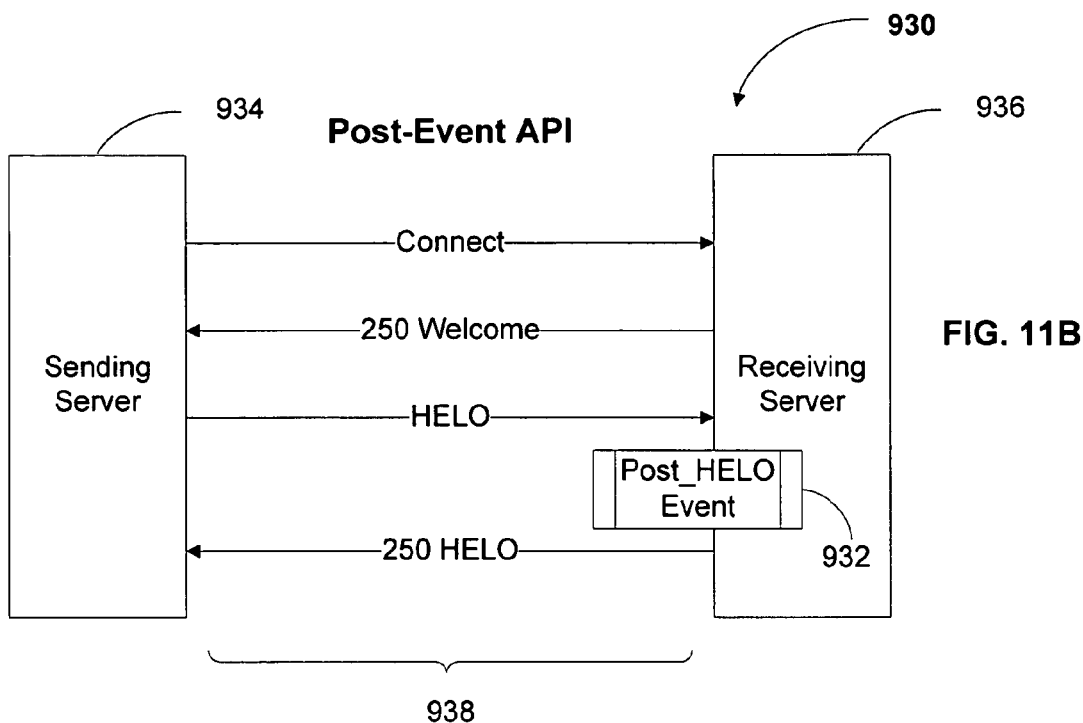
FIGS. 11B and 11C are diagrammatic illustrations of Post- and Pre-event API processes, respectively, of the present invention.
Figure 11C:
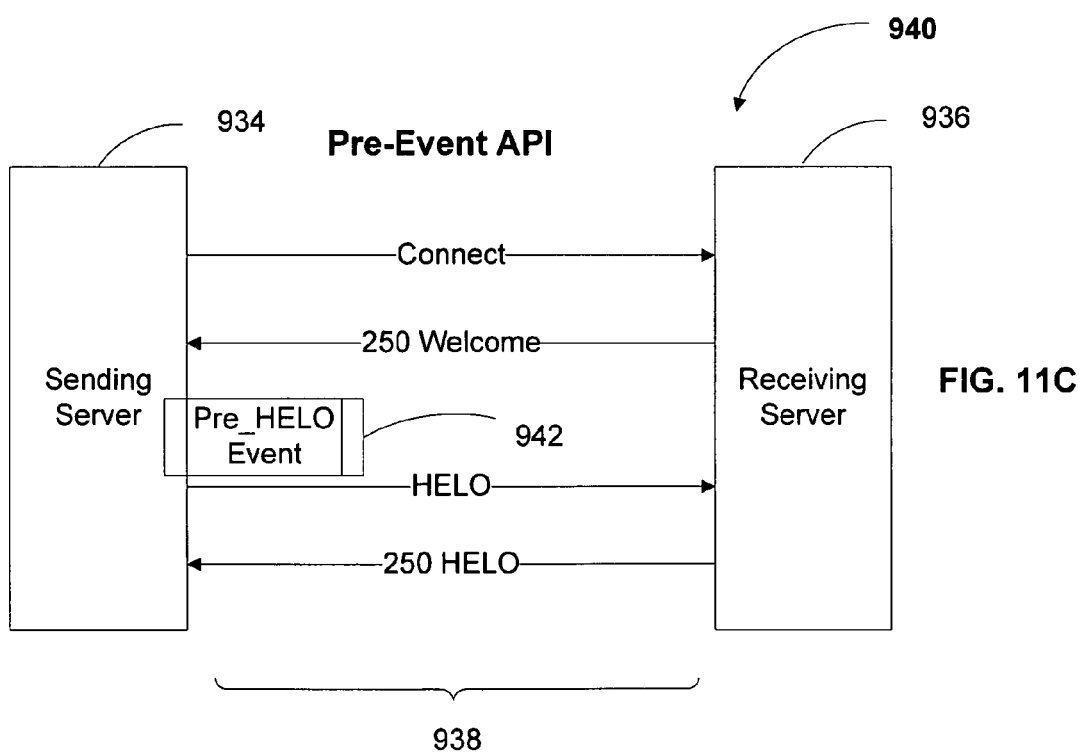

Examples of Post- and Pre-event registration are illustrated in FIGS. 11B and 11C. Referring first to FIG. 11B, an example of a post-event API process 930 including a post_HELO event registration 932 in accordance with the present invention is shown. Post-event API process 930 includes communication between a sending server 934 and a receiving server 936. A series of SMTP events (indicated by a bracket 938) take place between sending server 934 and receiving server 936, including a HELO request sent from the sending server to the receiving server. Post_HELO event registration 932 specifies that the API application registered for the post_HELO event will receive the message object after the server accepts the HELO command from the sending server. In contrast, FIG. 11C illustrates an example of a pre-event API process 940 including a pre_HELO event registration 942. In pre-event API process 940, the API application registered for the pre_HELO event will receive a message object before sending server 934 issues the HELO command to receiving server 936.

Figure 11D:
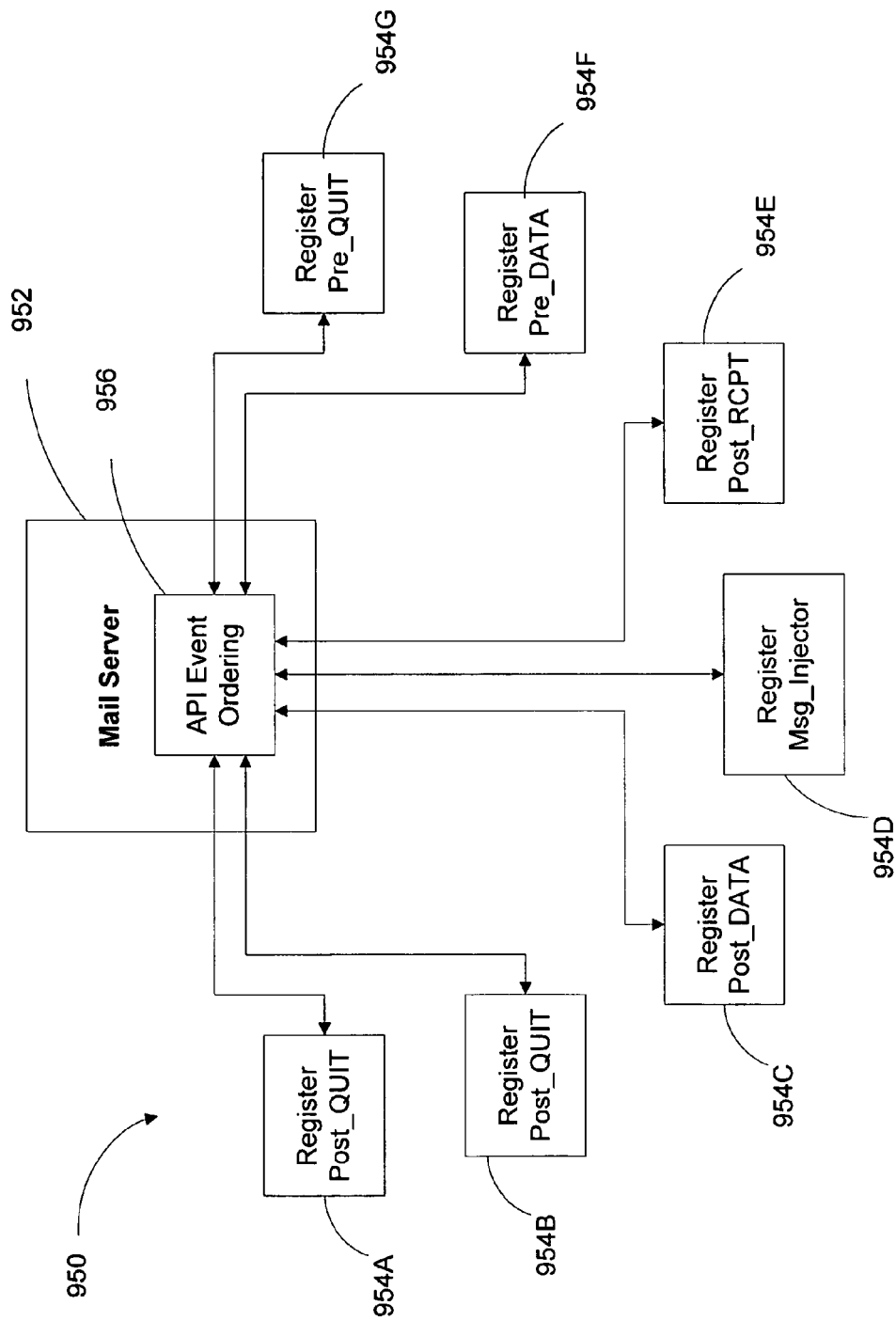
FIG. 11D is a diagrammatic illustration of registration of API events at a mail server in accordance with the present invention.

The addition of events that may be triggered before a messaging event (e.g., pre_HELO) allows filter applications to be applied to messages on their way OUTBOUND from a server, which is considered to be a significant advancement over the prior art MILTER process. In the API process of the present invention, an application may register with the mail server over a local or remote TCP socket connection. This registration of the application specifies the event that the sender would like to capture and the order in which that particular sender should be positioned in the listener queue. This API event registration concept of the present invention is illustrated in FIG. 11D, which shows a block diagram of an API schematic 950 in accordance with the present invention. API schematic 950 includes a central mail server 952, which handles a plurality of registrations (indicated by boxes with reference numerals 954A-954G) for at least some of the plurality of mail events listed above. That is, mail server 952 handles multiple registrations from multiple API applications, and multiple applications may register for the same event. Optionally, mail server 952 may include API event ordering capability (indicated by a box 956) such that mail server 952 may handles registrations from multiple applications while allowing each application to specify the order in which that particular API application should be positioned in the listener queue. Both listener and the API application may be equipped with high performance message object queues to temporarily hold messages awaiting processing. The queue mechanism would allow for faster feeding of the API applications and the listener without blocking the main activity of the server. The inclusion of API event ordering capability 956 allows, for example, certain API applications to have precedence over other API applications.

Figure 11E:
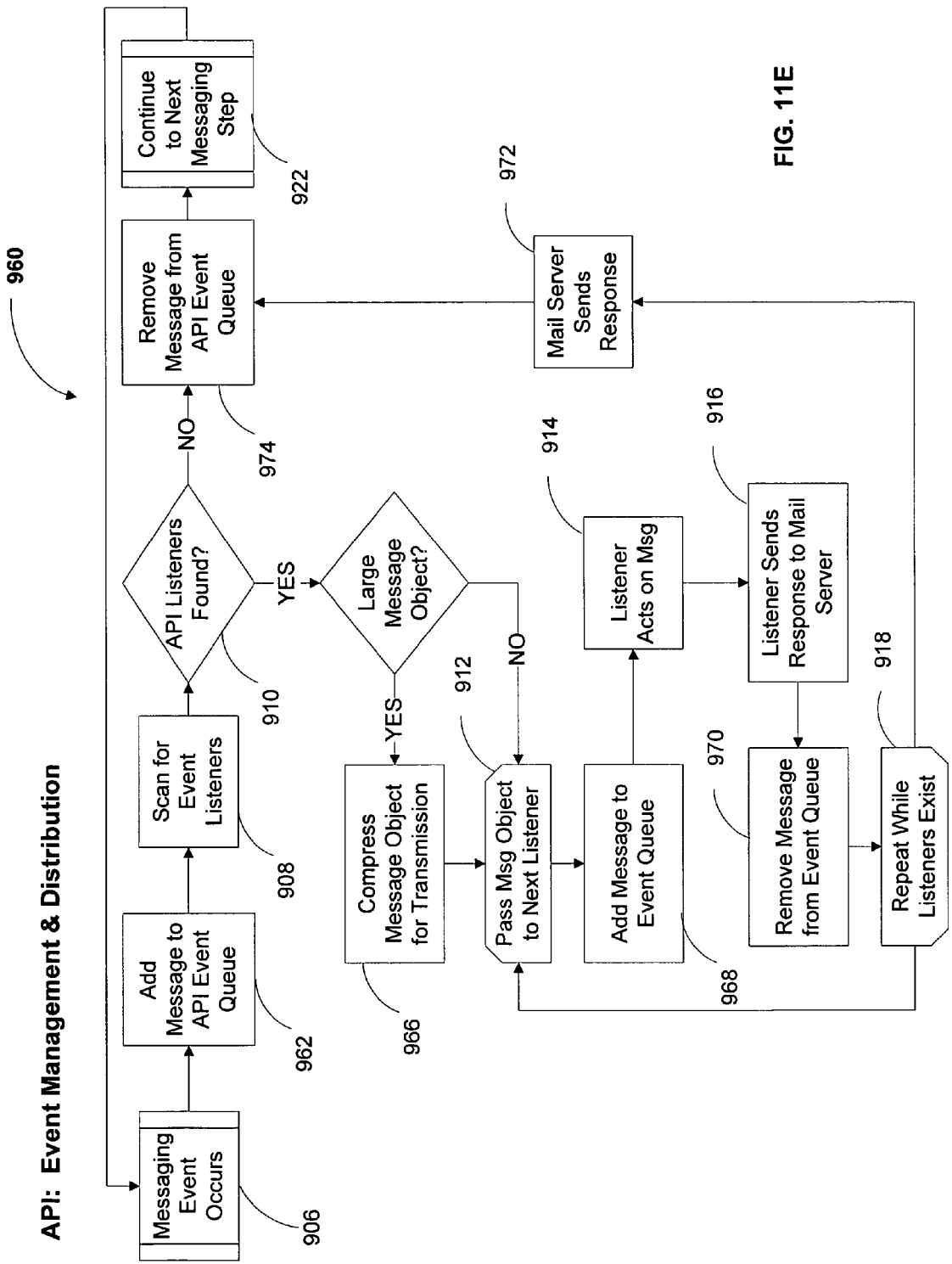
FIG. 11E is a flow chart diagram illustrating an API event management and distribution process in accordance with the present invention.

Referring now to FIG. 11E in conjunction with FIGS. 11A and 11D, the process by which mail server 952 handles multiple registrations is described. An API event management and distribution process 960 of FIG. 11E of the present invention shares some of the steps of MILTER API process 900 shown FIG. 11A but includes a number of steps in addition to MILTER process 900. Process 960 is triggered within mail server 952 when an API event is executed within the mail server in step 906. Following the execution of an API event in step 906, the mail server then adds the message to an API event queue in a step 962. The mail server then scans for event listeners for that API event in step 908. Decision 910 follows step 908 to determine whether API listeners have been found. If the answer to decision 910 is YES, one or more API listeners have been found for that event, then the size of the message is determined in a decision 964. If decision 964 determines that the message is larger than a predetermined threshold, the message is compressed in a step 966 before progressing to step 912. If decision 964 determines that the message is sufficiently small, then the message is immediately directed to step 912 to pass the message to the first listener event queue. This transmission may be performed, for example, using a socket channel and selector method. The first listener event queue accepts messages in a step 968, after which the listener may act upon the message in step 914 by changing it, deleting it or letting it pass through unmodified. In step 916, the listener returns the message to the event queue and sends a response to the mail server. This response may include, for example, a result code for the mail server to pass back to the initiating sender server. The message is then removed from the event queue in a step 970. If additional API listeners have been found, the message is then passed onto a second listener in a step 918, and steps 912, 968, 916 and 970 are repeated with the second listener. These steps are repeated until all of the API listeners have acted upon the message. The mail server then sends a response to the initiating, sender server in a step 972 in accordance with a prescribed messaging protocol (e.g., SMTP). The message is then removed from the API event queue in a step 974 and the process proceeds to the next message event in step 922. As a variation, process 960 of FIG. 11E may be performed in conjunction with the deliverability confirmation process described above.

Configurable RAM or Hard Drive Message Processing

Figure 12A:
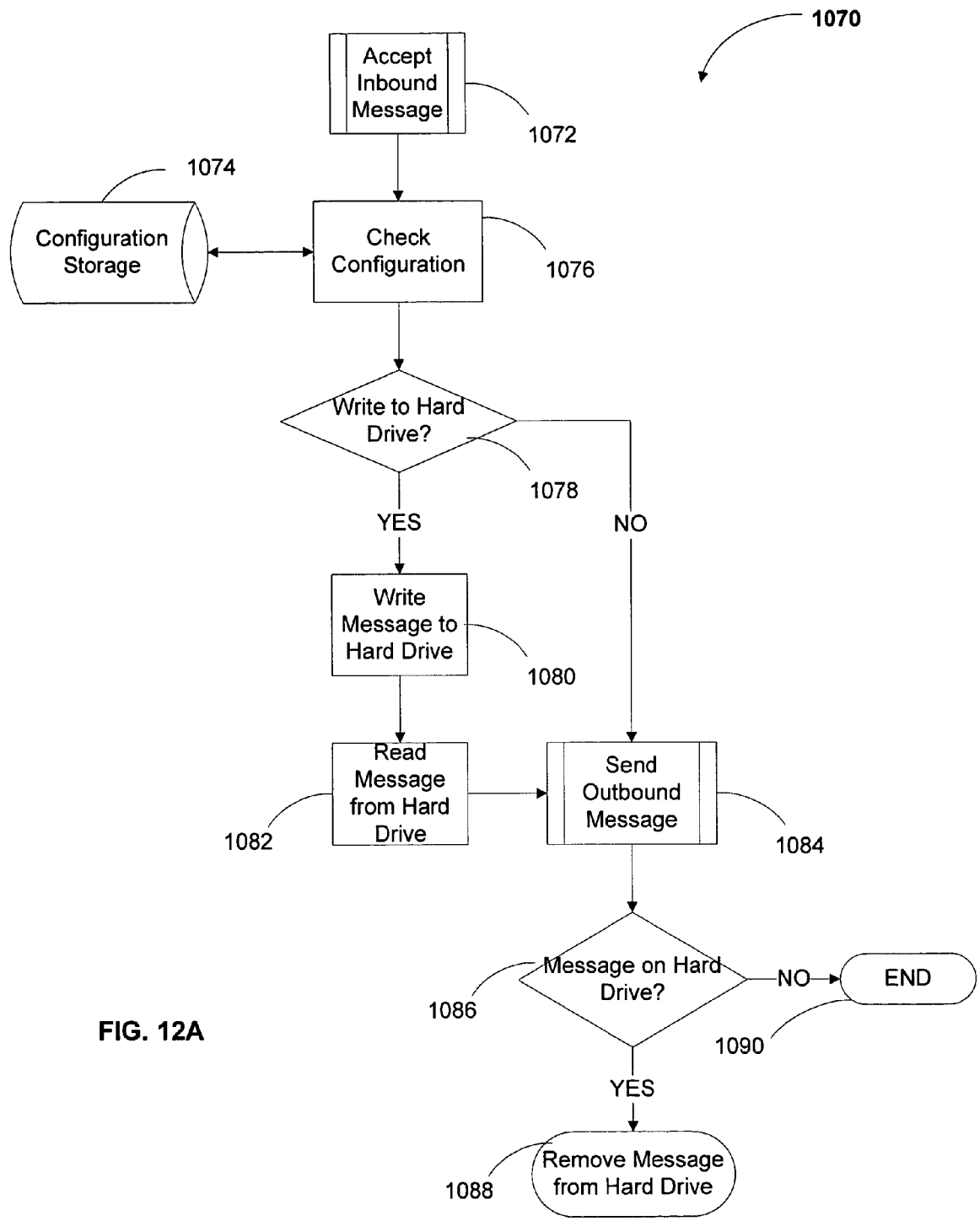
FIGS. 12A and 12B are flow chart diagrams illustrating possible embodiments of a configurable RAM/HDD message process in accordance with the present invention.

As an example of a possible modification to the aforedescribed embodiments, the electronic message delivery system of the present invention may be configured to provide a choice between handling the messages as data packets in RAM processing, as described above, and as files saved on a hard disk drive (HDD), as used in the prior art. That is, as a message, which is intended for delivery to a recipient at a recipient server, is received from a sender, the sending mail server may be configured to write a part or all of this message to HDD for storage. This option of storing part or all of the message to HDD complements the RAM-based processing of the present invention as described above by providing, for example, a backup storage system in case of a power outage during the RAM processing. Such a modified system is illustrated in FIG. 12A, which shows a flow diagram of a message handling process as it takes place within a mail server using a configurable RAM/HDD message processing scheme. The message handling process, which is generally indicated by a reference numeral 1070, begins with the system accepting a message from a sender server in a step 1072. The configuration of whether or not a part or all of a given message should be saved to HDD is stored in a configuration storage 1074. The configuration as specified in configuration storage 1074 is checked in a step 1076. A decision 1078 is made to determine whether or not a given message, in part or in whole, is to be saved to HDD. If the answer to decision 1078 is YES, a part or all of the message should be saved to HDD, then at least a part of the message is written to temporary storage on HDD in a step 1080. The mail server then reads this stored message from HDD in a step 1082, then proceeds to a delivery sequence in a step 1084 as described above, including, for instance, delivery confirmation and late stage message creation as shown in the aforedescribed FIG. 9B. If the answer to decision 1078 is NO, the message should not be saved to HDD, then the mail server proceeds directly to the delivery sequence in step 1084. Additionally, following delivery step 1084, the mail server makes a decision 1086 to again determine whether or not the message has been saved to HDD. If the answer to decision 1086 is YES, a part or all of the message has been saved to HDD, then the saved message may be optionally removed from HDD in a step 1088. If the answer to decision 1086 is NO, the message has not been saved to HDD, then the message processing is simply ended in a step 1090. This configurable RAM/HDD message processing is advantageous because it allows an administrator to configure a preferred balance between delivery speed and the certainty of message recovery in the event of system failure.

Figure 12B:
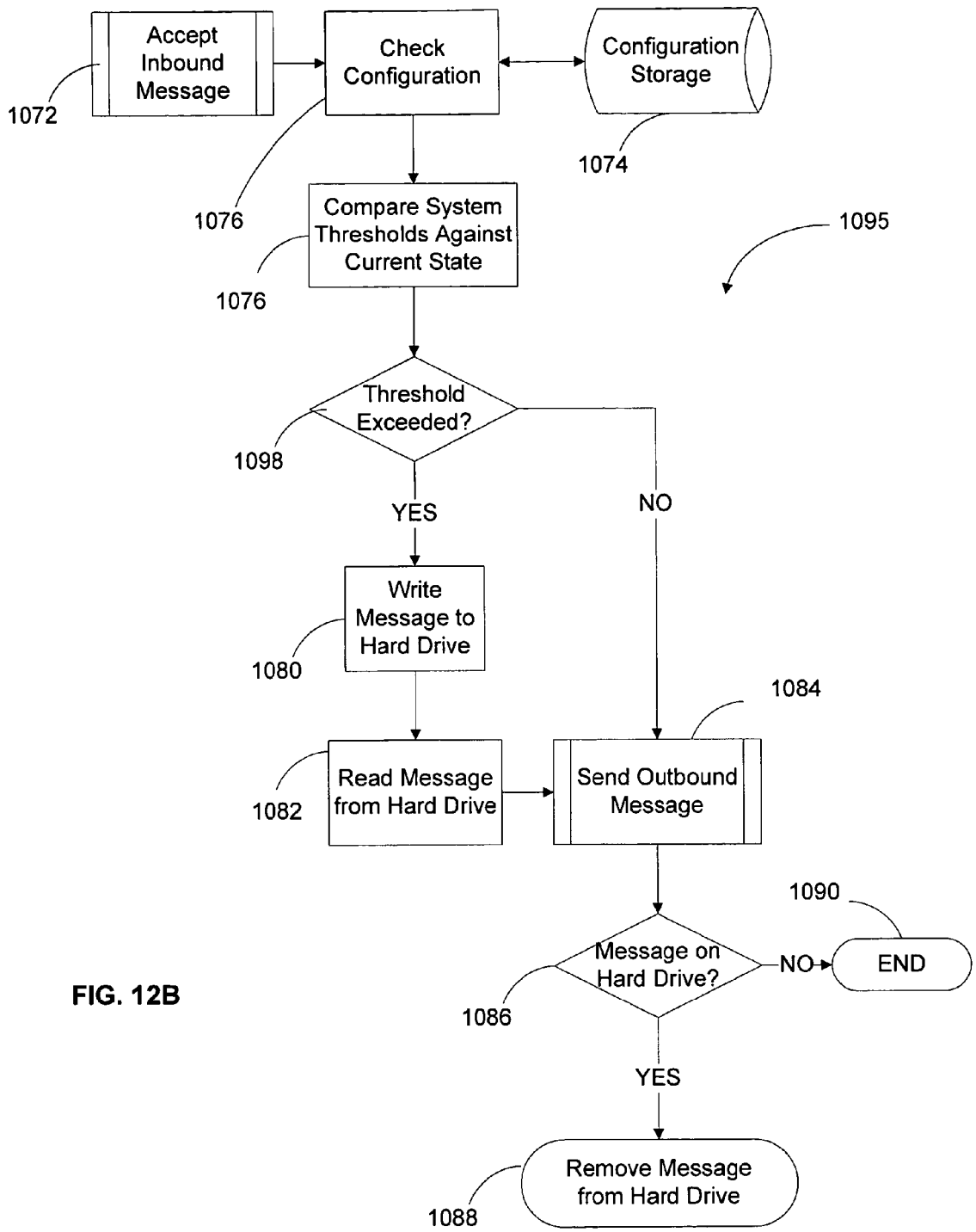

As still another alternative, the configurable RAM/HDD message processing may be modified to determine whether or not a given message should be saved to HDD based on a predetermined system threshold. Such a threshold-based process within the mail server is similar to the process illustrated in FIG. 12A, but the threshold-based process checks the current state of the mail server against a known system performance threshold (e.g., memory usage) to determine whether or not a particular message should be saved to HDD. The details of a threshold-based process 1095 are illustrated in FIG. 12B. Threshold-based process 1095 is substantially similar to message handling process 1070 as shown in FIG. 12A, but additionally includes a step 1096 to compare system thresholds against the current state. In this comparison step 1096, the mail server compares the current state of the system against a known system performance threshold, such as memory usage, hard drive usage and throughput capacity. Then a decision 1098 is made to determine whether or not this predetermined threshold has been met. If decision 1098 is YES, the particular threshold is exceeded, then the message is written to HDD in step 1080. If decision 1098 is NO, the particular threshold has not been met, then the message is directed to the delivery sequence in step 1084. Such a threshold-based system is advantageous because an administrator may set system usage thresholds or "danger levels" that specify when to begin store and forward processing to ensure message recovery in the event of system failure when system resources approach stressful usage levels.

Channel Selector Socket Management

Another consideration in the mail server art is the use of socket communication for email transmission between servers. As a brief background, a socket is a mechanism for creating a physical remote or local connection between processes. Sockets interface the standard input/output (I/O) function stream services of an operating system (e.g., UNIX) via its network communication facilities. The socket function creates a communications end-point and returns a file descriptor with which to access that socket. The socket has associated with it a socket address, consisting of a port number and the local host's network address.

Figure 13A:
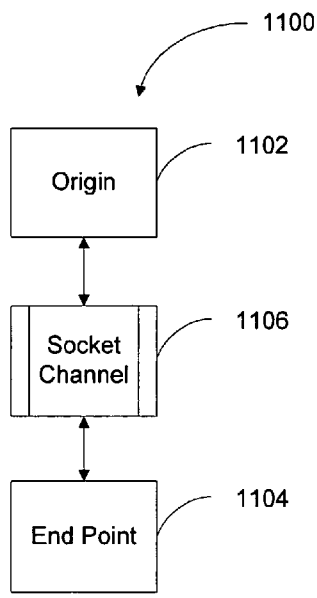
FIG. 13A is a diagrammatic illustration of a single thread model of socket communication of the prior art.

The classic, socket communication model is a single socket model illustrated in FIG. 13A. In a single socket model 1100 as shown in FIG. 13A, communication between a sending server (origin) 1102 and a receiving server (end point) 1104 takes place between a dedicated, single socket channel 1106.

Figure 13B:
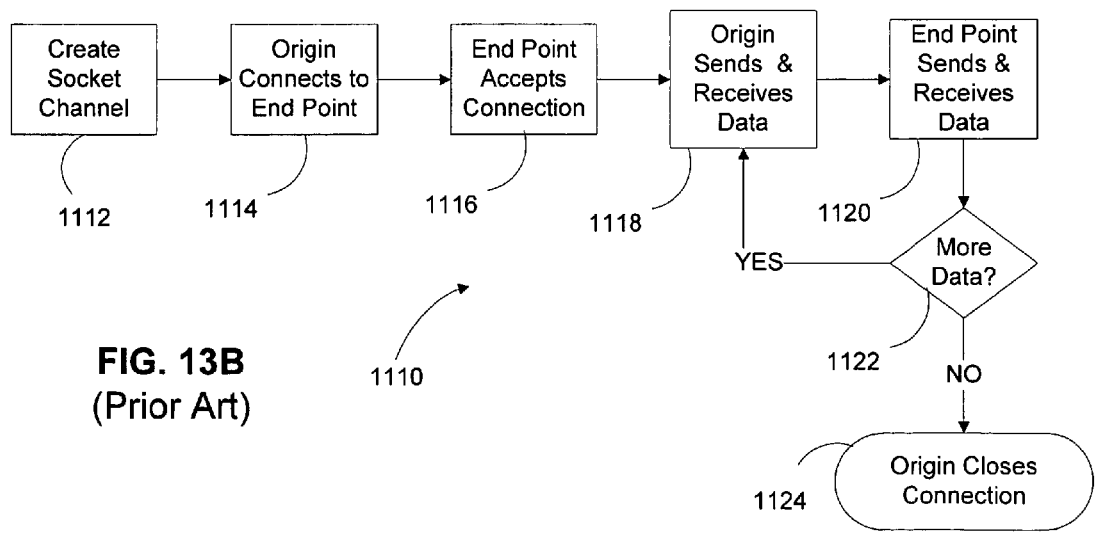
FIG. 13B is a flow chart diagram illustrating the single tread model socket communication process of the prior art of FIG. 13A.

Referring now to FIG. 13B in conjunction with FIG. 13A, of the classic, single socket creation and communication process is described. FIG. 13B shows a flow diagram of a standard process sequence 1110 for the transmission of e-mail uses socket communications between servers by establishing socket connection 1106 between origin 1102 and end point 1104. Typically, the sequence is initiated any time a sending server begins the process of sending a message to a recipient server at a location on a network or on the Internet for which the server does not already have a socket connection. The prior art socket connection process may be summarized with reference to FIG. 13B as follows:

a. In a step 1112, create a socket at the sending server (origin).

b. In a step 1114, connect the socket from the sending server to the receiving server (end point).

c. In a step 1116, the recipient server elects to accept the socket connection. Once the connection is established and accepted, the socket communications channel is available to transfer information, including both standard electronic message protocol conversation data and message content, between the origin and the end point.

d. In a step 1118, the sending server sends data to and receives data from the receiving server.

e. The receiving server sends and receives data in a step 1120.

f. Following step 1120, a decision 1122 is made to determine whether or not more data need to be transferred between the sending and receiving servers. If the answer to decision 1122 is YES, more data need to be exchanged between the sending and receiving servers, then the process cycles back through steps 1108 and 1110. If the answer to decision 1122 is NO, the flow of data is complete, then the sending server terminates the connection in a step 1124.

Both sides (i.e., origin and end point) remain active while connected through the socket. Either side may interrupt or close the connection. The connection may be used to transmit multiple e-mail messages (from a waiting queue) to the end point server. Upon completion of the transmission, interruption or closure by either one of the servers, the connection is severed and the socket disappears. The sequence from socket creation to information transfer to closing of the connection and socket disappearance is standard and uniform in the current state of the art of e-mail transmission between servers. Generally, open sockets will only exist where there has been a continuous flow of messages/data to the end point location (i.e., a new message to the location is presented to the socket prior to the completion of transmission of the current message).

There are various problems inherent in the classic, single socket communication process of the prior art. In the prior art process illustrated in FIGS. 13A and 13B, e-mail transmission is conducted through a conversation protocol which involves multiple data transactions. This conversation protocol includes both protocol signal exchanges (i.e., handshaking) and multiple data transactions for transmitting the message itself. In the current state of the art, dedicated threads with individually bound sockets must await the completion of all data transactions for a particular message between the corresponding sending and receiving servers. Each concurrent thread/socket pair is dedicated to a conversation with a specific location, and is created and terminated as individual messages/conversations are initiated and terminated. In order to conduct multiple simultaneous e-mail transmissions to multiple End Points, the sending server must generate multiple sockets corresponding to the multiple End Points. The most efficient current practice uses a multi-threaded application design, in which one thread manages one socket. In this case, the number of potential simultaneous sockets allowable is governed by the number of possible simultaneous threads that can be handled by the sending server according to constraints established by the underlying operating system environment. However, the number of simultaneous threads that may be generated by currently available mail servers is limited by the underlying operating system of the computer housing the mail server. Therefore, the rate of simultaneous e-mail transmissions to multiple End Points (i.e., the general rate of e-mail transmission for a given e-mail server) is limited by the number of simultaneous threads and sockets that may be supported by the operating system of the server. Thus, resource stagnation and contention are common issues in this type of architecture.

Figures 13C, 13D:
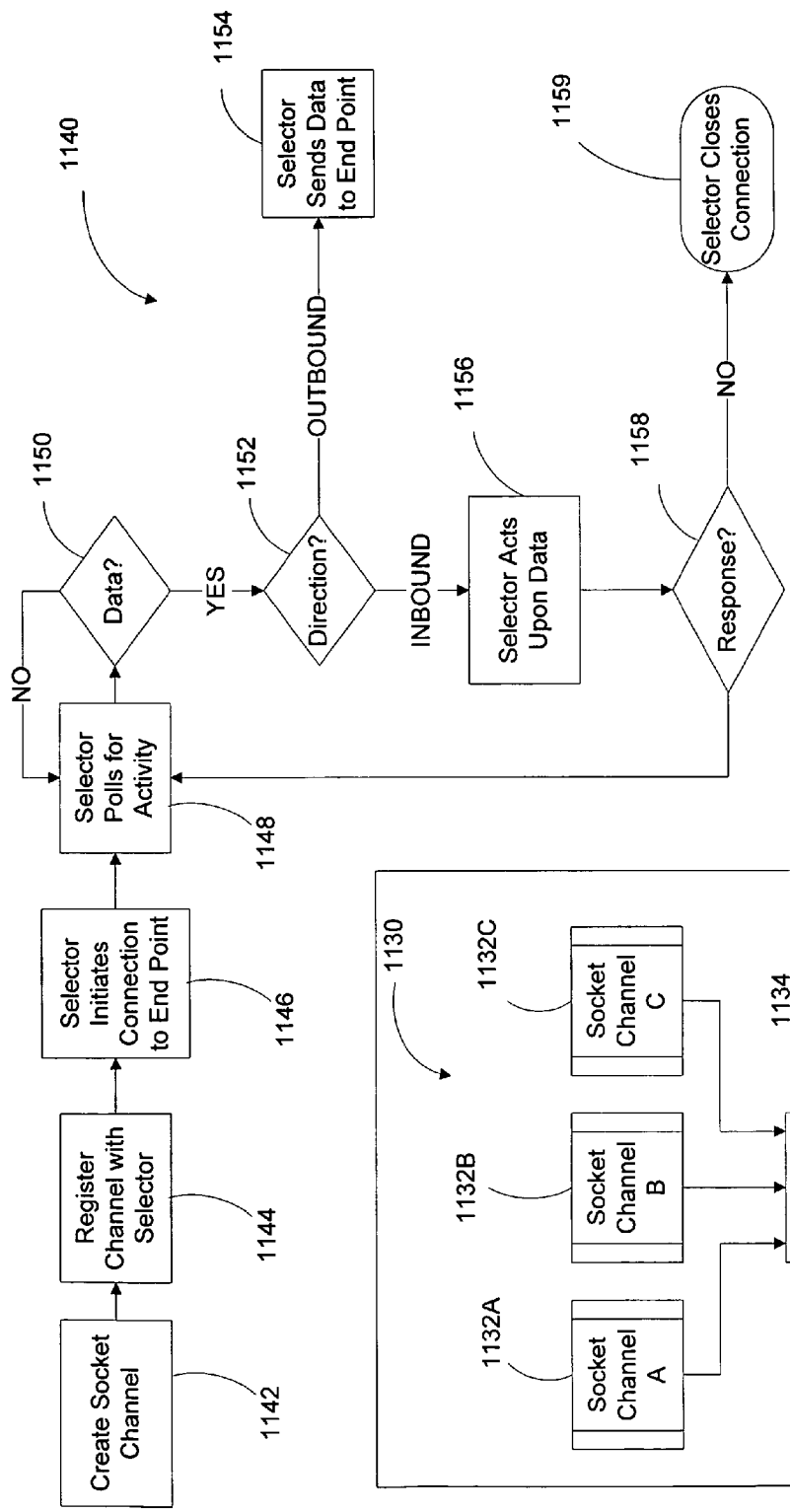
FIG. 13C is a diagrammatic illustration of a multiple thread model, socket channel and selector embodiment for data transmission between servers of the prior art.
FIG. 13D is a flow chart diagram illustrating the prior art selector processes using TCP corresponding to FIG. 13B.

Recent advances in data communication between servers, illustrated in FIGS. 13C and 13D, includes the use of a selector (hence, a single thread) for a computer server to manage the flow of data across multiple socket channels between servers in order to transmit messages from a sender server (origin) to other recipient servers (end point). The selector essentially replaces the socket management function of multiple threads described earlier. This prior art process is conducted using the Transmission Control Protocol (TCP), which is an Internet transport layer protocol for providing full-duplex, process-to-process connections.

First referring to FIG. 13C, a socket channels and selector scheme for data transmission of the prior art is described. The prior art communication process involves three main components: 1) the socket channel (or, simply, channel), the selector, and the receiving server (or end point). As shown in FIG. 13C, a multiple socket channels and selector scheme 1130 includes a plurality of socket channels (represented by Channels A-C indicated by reference numbers 1132A-C, respectively). Each socket channel is created as the connection route for data. Each one of socket channels 1132A-C goes through a registration 1134 with a selector 1136. In essence, the selector serves as a "gatekeeper" of all communication to and from the mail server for keeping tabs on both inbound and outbound communication, and the selector may be responsible for many simultaneous communication channels.

Referring now to FIG. 13D in conjunction with FIG. 13C, a TCP socket channels and selector scheme of the prior art is described. In a prior art TCP process 1140, a socket channel is created in a step 1142 as a connection route for data. A plurality of socket channels are created in response to multiple communication requests. Each socket channel created in step 1142 registers with selector 1136, specifying the End Point location (e.g., IP address) and the type of event it would like to receive (e.g., socket writes, reads, etc.) in a step 1144. The selector then initiates the requested connection with the End Point in a step 1146, then polls for activity registered by the corresponding channel in a step 1148. In a decision 1150, the selector determines whether or not data are coming through one of the socket connections. If the answer to decision 1150 is NO, there is no data present coming in or going out, then the selector polls for data communication activity at step 1148. If the answer to decision 1150 is YES, data is being transmitted through one of the socket connections, then the selector proceeds to a decision 1152 to determine the direction of data transmission. If decision 1152 determines that the direction of data transmission is OUTBOUND from sender server to the recipient server, then the selector directs data to the End Point in a step 1154. If decision 1152 determines that the direction of data transmission is INBOUND, then the selector acts upon the data in a step 1156. The action taken by the selector is determined by the protocol, which in this case is TCP. In this prior art process 1140, the channel must determine if the data it has received is enough to complete a given task. If there is insufficient data, then the channel will wait for additional data from the selector, and the selector returns to step 1148 to poll for further activity. Once a complete protocol message has been received from the selector, then the channel will act upon the total data received, based on the protocol. If the channel issues a response, the message is sent back to the selector for delivery to the end point through steps 1148 and 1154. If no response from the channel is required, then the selector closes the connection in a step 1159. The communication socket may be interrupted or closed at either end.

The prior art socket channels and selector TCP process as shown in FIGS. 13C and 13D exhibits a number of problems. In prior art process 1140, the processing logic is conducted within the selector, while the channels merely manage requests to the selector. This prior art process of FIG. 13D is currently used in web servers for managing hypertext transfer protocol (HTTP) communications, which uses a one step, request/response paradigm. That is, the entire process is based on one request from the origin and one response from the end point. Applicants have found that, although the socket channels and selector TCP process shown in FIG. 13D provides some improvement in data communication over the classic single socket—single communication channel process of FIGS. 13A and 13B, process 1140 is still considered inefficient and unsuitable for multi-step protocols, such as those used in e-mail delivery.

In order to circumvent the aforedescribed problems of prior art and adapt a socket communication process for use in e-mail delivery, Applicants have devised a number of data communication methods which provide alternatives to the socket communication method of the prior art. In particular, Applicants have developed an improved electronic messaging server based on the channel and selector TCP method but providing additional advantages over the socket channels and selector scheme as illustrated in FIGS. 13E and 13F. Specifically, the socket channels and selector TCP process of the present invention provides for state management and buffer sizing to the socket channel in order to allow storage of incomplete commands in the buffer, thus accommodating multiple step communication with data of varying sizes. This addition of variable buffer sizing and ability to handle incomplete reads and writes from the selector to the socket channel consequently shifts the data processing from the selector to the channel. Applicants submit that this addition is a significant change from the prior art channel and selector methods, and, moreover, Applicants have found that moving the processing logic from the selector to the socket channel provides improvements in data handling capacity of the mail server above and beyond expected results, as will be described in further detail immediately hereinafter.

Referring first to FIG. 13E, a multiple socket/thread model 1160 of the present invention includes a plurality of socket channels as in the prior art (e.g., as shown in FIG. 13C), but a selector 1162 now acts to regulate communication between a plurality of end points (represented by End Points A-C indicated by reference numbers 1164A-C, respectively). In essence, selector 1162 acts as a gatekeeper of data while the actual data processing occurs at the channels. The process associated with model 1160 is described immediately hereinafter in reference to FIG. 13F.

Referring to FIG. 13F in conjunction with FIG. 13E, a TCP process 1170 using the socket channels and selector scheme of the present invention is illustrated. TCP process 1170 includes the same steps 1142-1154 as prior art socket communication process 1140 of FIG. 13D. However, the process of the present invention diverges from the prior art process following the data flow direction (INBOUND or OUTBOUND) determination. At this point, once INBOUND data is received from the end point, the selector allocates an appropriate size buffer and directs the data to the socket channel for processing in a step 1172. A decision 1174 is then made at the channel to determine whether or not the data received is sufficient to complete a protocol command. If the answer to decision 1174 is NO, there is not sufficient information to complete the task at hand, then the process returns to step 1148 to poll for additional data. If the answer to decision 1174 is YES, a complete protocol message has been received, then the socket channel processes the data in a step 1176 in accordance with the protocol being employed. In a decision 1178, a determination is made at the socket channel whether a response from the socket channel should be sent to the end point. If the answer to decision 1178 is YES, then the result of processing step 1176 is directed to step 1148 for delivery to the end point. If the answer to decision 1178 is NO, no channel response is required, then the channel instructs the selector to close the connection in a step 1180 and the selector closes the connection in step 1159. The connection may also be interrupted by the end point.

The channel and selector TCP method described above may be used to send and receive email via SMTP and other electronic messaging protocols. While the selector is waiting for a response from the End Point for a given socket channel, the selector is free to initiate, manage, communicate with or close other socket connections. This method is advantageous because it greatly increases the throughput capabilities for SMTP data traffic, and thus the performance of email delivery servers, by dramatically increasing the efficiency of data transmissions.

Prior art e-mail delivery technologies, before the innovations developed by Applicants, yield 32 messages/second peak throughput. With the inclusion of the aforedescribed innovations by Applicants, but without the socket channel and selector TCP process of the present invention, the message delivery system achieved 150 messages/second peak throughput. Prior to actual implementation of the aforedescribed socket channel and selector TCP process of the present invention, the expected performance improvement for SMTP email delivery was approximately 50 to 75% improvement over the 150 messages/second peak throughput (for 10,000-byte messages) already achieved. Upon implementation, however, it has been found that the socket channel and selector TCP process of the present invention, in combination with the earlier described improvements developed by Applicants, yields a message throughput of over 800 messages/second (for 10,000 messages), resulting in an extraordinary 530% increase in performance achieved by Applicants without the socket channel and selector TCP process and 2500% over the known prior art. Applicants submit this improvement is significant and unexpected.

The channel and selector method described in reference to FIGS. 13E and F may also be applied to stateless protocols, such as User Datagram Protocol (UDP). The data transmission process in this case is similar to the TCP scheme described above, but uses a stateless protocol, which neither guarantees delivery nor requires a connection. These concepts are further described in detail in reference to FIG. 13G immediately hereinafter.

Figure 13G:
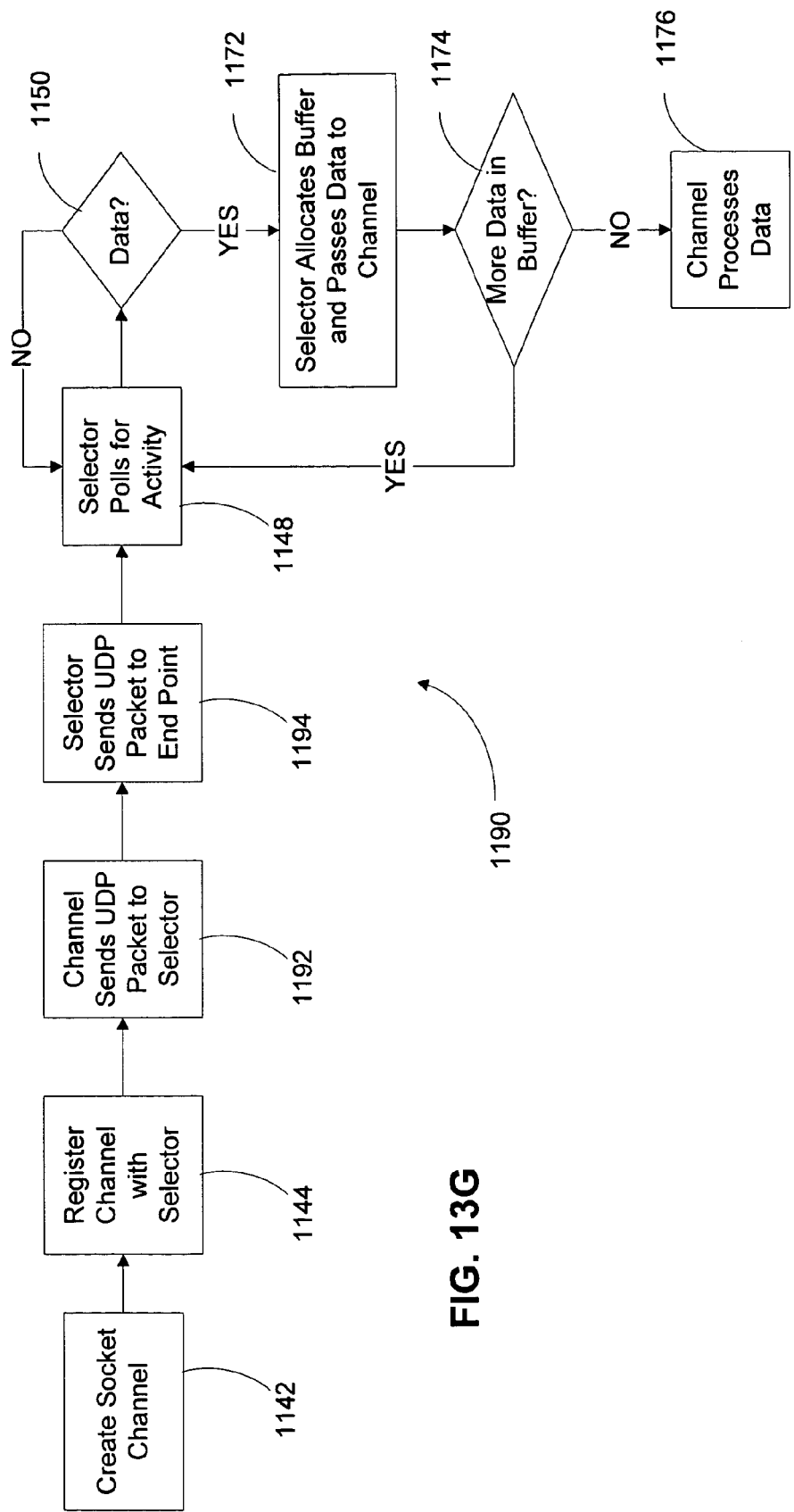
FIG. 13G is a flow chart diagram illustrating the present invention selector processing using UDP.

FIG. 13G illustrates a data communication process using UDP, generally referred to by a reference numeral 1190. After the communication channel socket has been created and the channel socket has been registered with the selector, the channel socket creates and sends a datagram packet (e.g., UDP packet) to the selector in a step 1192. The datagram packet is then passed onto the End Point by the selector in a step 1194, then the selector polls for data transmission activity in step 1148. Once a response is received from the End Point, the selector allocates the appropriate buffer and the response is passed onto the originating channel in step 1172. The UDP communication as shown in FIG. 13G is simpler than the TCP communication of FIG. 13F because the communication process of FIG. 13G is based on a stateless protocol such that the complete communication between sender and receiving servers consists of a single request and a single response. As before, the selector may handle many simultaneous UDP communications.

The channel selector socket management process using UDP may be used, for example, in a DNS resolver to greatly improve the speed of DNS lookup processes. The DNS resolver of the present invention utilizes the socket channel and selector process to send and request domain name lookup data using standard DNS protocol. Such a DNS resolver may be included within the originating mail server itself so as to facilitate the transmission and reception of e-mail. The channel selector socket management processes using TCP or UDP may be combined with, for example, the deliverability confirmation process described above.

Prior to actual implementation of the DNS resolver of the present invention, the anticipated performance improvement for DNS resolution (i.e., lookups) using the socket channel and selector process was approximately a 100% improvement over the current state of the art method (BIND), which has an average peak performance rate of 50 lookups per second. Unexpectedly, Applicants have found that the DNS resolver based on the socket channel and selector process of the present invention yields an astonishing rate of 3400 lookups per second, thus providing a 6800% increase in performance over the existing prior art.

The socket channel and selector process may be combined, for example, with the aforedescribed API process of the present invention in order to achieve a higher performance API application with very low latency on message transmission from the server to the API application.

Although each of the aforedescribed embodiments have been illustrated with various components having particular respective orientations, it should be understood that the present invention may take on a variety of specific configurations with the various components being located in a wide variety of positions and mutual orientations and still remain within the spirit and scope of the present invention. Furthermore, suitable equivalents may be used in place of or in addition to the various components, the function and use of such substitute or additional components being held to be familiar to those skilled in the art and are therefore regarded as falling within the scope of the present invention. For example, although each of the aforedescribed embodiments have been discussed mainly using the case of e-mail messaging, the electronic message delivery system of the present invention may be readily configured to accommodate other types of electronic messages such as, for instance, messages to and from cellular phones and other handheld devices.

Therefore, the present examples are to be considered as illustrative and not restrictive, and the invention is not to be limited to the details given herein but may be modified within the scope of the appended claims.

What is claimed is:

1. In a messaging system interfaced through the Internet, a method for processing a message from a sender and intended for delivery to at least one recipient, which sender is interfaced to the Internet through a sender server capable of communicating with a recipient server, said method comprising:
at said sender server, receiving from said sender a plurality of discrete data packets for use in defining said message, at least one of said plurality of discrete data packets including recipient information and at least another one of said plurality of discrete data packets including message body;
directing said plurality of discrete data packets through an application program interface to one of a plurality of external applications for performing at least one of (i) modifying said plurality of discrete data packets according to a first predetermined set of rules, (ii) adding additional data packets to said plurality of discrete data packets according to a second predetermined set of rules, and (iii) ordering said plurality of discrete data packets according to a third predetermined set of rules, and, consequently, for providing a plurality of resultant data packets;
receiving said plurality of resultant data packets from said one of a plurality of external applications through said application program interface;
if a group of messages is scheduled for delivery, ordering said plurality of resultant data packets within the group of messages based on said recipient information such that sending messages directed to a particular domain within the group of messages is evenly distributed over time;
generating said message by combining at least a portion of said plurality of resultant data packets;
establishing a connection through the Internet from said sender server to said recipient server; and
directing said message through said connection to said recipient server for delivery to said recipient.

2. In a messaging system interfaced through the Internet, a method for processing a message from a sender and intended for delivery to at least one recipient, which sender is interfaced to the Internet through a sender server capable of communicating with a recipient server, said method comprising:
at said sender server, receiving from said sender a plurality of discrete data packets for use in defining said message, at least one of said plurality of discrete data packets including recipient information and at least another one of said plurality of discrete data packets including message body;
directing said plurality of discrete data packets through an application program interface to one of a plurality of external applications for performing at least one of (i) modifying said plurality of discrete data packets according to a first predetermined set of rules, (ii) adding additional data packets to said plurality of discrete data packets according to a second predetermined set of rules, and (iii) ordering said plurality of discrete data packets according to a third predetermined set of rules, and, consequently, for providing a plurality of resultant data packets;
receiving said plurality of resultant data packets from said one of a plurality of external applications through said application program interface;
if a group of messages is scheduled for delivery, ordering said plurality of resultant data packets within the group of messages based on said recipient information such that sending messages directed to a particular domain within the group of messages is evenly distributed over time; and
generating said message by combining at least a portion of said plurality of resultant data packets.

3. The method of claim 2 wherein said messaging system further includes a hard drive for storing files, and wherein said message is handled without storing said message as one of said files in said hard drive.

4. In a messaging system interfaced through the Internet, a method for processing a message from a sender and intended for delivery to at least one recipient, which sender is interfaced to the Internet through a sender server capable of communicating with a recipient server, said method comprising:
at said sender server, separating said message into a plurality of discrete data packets, at least one of said plurality of discrete data packets including recipient information and at least another one of said plurality of discrete data packets including message body;
directing said plurality of discrete data packets through an application program interface to one of a plurality of external applications for performing at least one of (i) modifying said plurality of discrete data packets according to a first predetermined set of rules, (ii) adding additional data packets to said plurality of discrete data packets according to a second predetermined set of rules, and (iii) ordering said plurality of discrete data packets according to a third predetermined set of rules, and, consequently, for providing a plurality of resultant data packets;
receiving said plurality of resultant data packets from said one of a plurality of external applications through said application program interface;
if a group of messages is scheduled for delivery, ordering said plurality of resultant data packets within said group of messages or data packets corresponding to said group of messages based on said recipient information such that sending messages addressed to the same domain within said group of messages is evenly distributed over time; and
generating said message by combining at least a portion of said plurality of resultant data packets.

5. The method of claim 4 further comprising:
establishing a connection through the Internet from said sender server to said recipient server; and
directing said message through said connection to said recipient server for delivery to said recipient.

6. In a messaging system interfaced through the Internet, a method for processing a group of messages from a sender, which sender is interfaced to the Internet through a sender server capable of communicating with a plurality of recipient servers, each message in said group of messages being intended for delivery to a recipient, said method comprising:
at said sender server, separating each message in said group of messages into a plurality of discrete data packets, at least one of said plurality of discrete data packets including recipient information and at least another one of said plurality of discrete data packets including message body for the corresponding message out of said group of messages; and
ordering said plurality of discrete data packets within said group of messages based on said recipient information such that sending messages directed to a particular domain within said group of messages is evenly distributed over time.

7. The method of claim 6 further comprising:

directing said plurality of discrete data packets through an application program interface to one of a plurality of external applications for performing at least one of (i) modifying said plurality of discrete data packets according to a first predetermined set of rules, (ii) adding additional data packets to said plurality of discrete data packets according to a second predetermined set of rules, and (iii) ordering said plurality of discrete data packets according to a third predetermined set of rules, and, consequently, for providing a plurality of resultant data packets.

* * * * *